(12) United States Patent
Bachet et al.

(10) Patent No.: US 8,375,408 B2
(45) Date of Patent: Feb. 12, 2013

(54) SYSTEM AND METHOD OF PROVIDING MEDIA CONTENT

(75) Inventors: Franck Bachet, Paris (FR); Claire Frezal-Hugonet, Paris (FR)

(73) Assignee: Thomson Licensing, Issy les Moulineaux (FR)

( * ) Notice: Subject to any disclaimer, the term of this patent is extended or adjusted under 35 U.S.C. 154(b) by 2292 days.

(21) Appl. No.: 10/513,195

(22) PCT Filed: May 9, 2003

(86) PCT No.: PCT/IB03/02369
§ 371 (c)(1), (2), (4) Date: Nov. 2, 2004

(87) PCT Pub. No.: WO03/096699
PCT Pub. Date: Nov. 20, 2003

(65) Prior Publication Data
US 2010/0192175 A1   Jul. 29, 2010

(30) Foreign Application Priority Data
May 10, 2002  (EP) .................................... 02291177

(51) Int. Cl.
*G06F 3/00* (2006.01)
*G06F 13/00* (2006.01)
*H04N 5/445* (2006.01)

(52) U.S. Cl. .................. 725/40; 725/46; 725/33; 725/5; 725/9; 725/34; 725/134; 725/142

(58) Field of Classification Search .................... 386/83
See application file for complete search history.

(56) References Cited

U.S. PATENT DOCUMENTS

| | | | |
|---|---|---|---|
| 5,561,637 A | 10/1996 | Dan et al. | |
| 5,619,247 A * | 4/1997 | Russo | 725/104 |
| 5,977,964 A * | 11/1999 | Williams et al. | 715/721 |
| 6,177,931 B1 * | 1/2001 | Alexander et al. | 725/52 |
| 6,282,713 B1 * | 8/2001 | Kitsukawa et al. | 725/36 |
| 6,701,528 B1 * | 3/2004 | Arsenault et al. | 725/89 |
| 6,853,728 B1 * | 2/2005 | Kahn et al. | 380/239 |
| 7,590,999 B2 * | 9/2009 | Perlman | 725/141 |
| 2001/0033343 A1 | 10/2001 | Yap et al. | |

(Continued)

FOREIGN PATENT DOCUMENTS
EP   0 987 893 A1   3/2000
WO  WO-01/61756 A2   8/2001

(Continued)

*Primary Examiner* — Hunter B Lonsberry
*Assistant Examiner* — Jason J Chung
(74) *Attorney, Agent, or Firm* — Osha Liang LLP

(57) ABSTRACT

A system for providing content to a user, comprising a transmitter 502 for transmitting to a user's receiver/decoder 2000 guide data relating to a plurality of items of content, and each of said items of content to which said guide data relates, prior to commencement of a period of availability of said items of content to the user; and a receiver/decoder 2100 comprising means 2016 for receiving said guide data and said items of content, means 3120 for generating a display of said guide data to enable a user to select at least one of said items of content for storage, means 2100 for storing the selected at least one item of content upon receipt thereof, and means 3120 for enabling the user to access the stored at least one item of content upon request following commencement of said period.

38 Claims, 16 Drawing Sheets

U.S. PATENT DOCUMENTS

| | | | |
|---|---|---|---|
| 2001/0052123 A1* | 12/2001 | Kawai | 725/36 |
| 2002/0037160 A1 | 3/2002 | Locket et al. | |
| 2002/0056118 A1* | 5/2002 | Hunter et al. | 725/87 |
| 2002/0144262 A1* | 10/2002 | Plotnick et al. | 725/32 |
| 2008/0235725 A1* | 9/2008 | Hendricks | 725/35 |
| 2010/0107194 A1* | 4/2010 | Mckissick et al. | 725/40 |

FOREIGN PATENT DOCUMENTS

| | | |
|---|---|---|
| WO | WO-02/17635 A2 | 2/2002 |
| WO | WO 02054765 A1 * | 7/2002 |

* cited by examiner

| Push list identifier | Version identifier | Description | Start Date | End Date |
|---|---|---|---|---|
| | | Description of the Service | | |

| CRID | TITLE | MANDATORY | BIT RATE | DURATION | FILE SIZE | FREQUENCY OF TRANSMISSION |
|---|---|---|---|---|---|---|
| | | | | Information Specific to the Content | | |
| 0 | — | — | | — | | — |
| 1 | — | — | — | — | — | — |
| 2 | — | — | — | — | | — |
| 3 | — | — | — | — | — | — |
| — | — | — | | — | — | — |
| — | — | — | | — | — | — |

| DL No | 1 | | |
|---|---|---|---|
| CRID | TITLE | | |
| 0 | WAYNE'S WORLD | l | |
| l | l | l | |
| l | l | l | |
| l | l | l | |

7010

| CRID | TYPE | LOCATION |
|---|---|---|
| 0 | TEXT | A |
| 0 | IMAGE | B |
| 1 | l | l |
| l | l | l |
| l | l | l |

7012

| A | B | --- |
|---|---|---|
| --- | | |
| | | |

SYSTEM AND METHOD OF PROVIDING MEDIA CONTENT

The present invention relates to a system for and method of providing content. More particularly, the present invention relates to a transmitter, an apparatus for transmitting content to a receiver/decoder, a receiver/decoder, a distribution list, apparatus for managing a distribution list, and to apparatus for scheduling transmission of content. The invention also extends to a computer program product, a computer readable medium, a signal tangibly embodying a computer program product, and a broadcast system.

Digital television systems transmit television channels to the viewer in digital, rather than analogue, form. The digital channels are encoded into a digital data stream at the transmitter end, and are decoded at the receiver end using a digital receiver/decoder. To allow interactivity, an uplink may be provided, either via the same medium that delivers the television channels, or else via a different medium such as a telephone link. Further types of data, such as digital audio, software and interactive data can be or are also broadcast. As used herein, the term "digital television system" includes for example any satellite, terrestrial, cable and other system.

The term "receiver/decoder" as used herein may connote a receiver for receiving either encoded or non-encoded signals, for example television and/or radio signals, preferably in MPEG format, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4, and the MPEG-4 and other contemplated MPEG standards. In the context of the present patent application, the term includes all variants, modifications or developments of MPEG formats applicable to the field of digital data transmission.

In many digital broadcast systems a broadcast operator broadcasts a variety of channels provided by a number of content providers. Thus a viewer has access to a wide range of content.

Each content provider provides content in a serial form distributed over available broadcasting hours. Accordingly, content providers are forced to compete with one another in order to capture prime time audiences.

In general, content providers provide operators with electronic programme guide (EPG) data, which the operator forwards to receiver/decoders having resident EPG applications which enable users to view the EPG data. Typically, the EPG data is presented in a proprietary format specified by the operator and/or the resident EPG application. However, in such systems, the content provider has little or no impact on the presentation of content to the user via the EPG.

It is an aim of the present invention to at least overcome some of these problems.

According to a first aspect of the invention, there is provided a receiver/decoder comprising means (in the form of a processor and associated memory) for receiving content prior to commencement of a period of availability of said content to a user; means (in the form of a memory store) for storing said content; and means (in the form of a processor and associated memory) for enabling the user to access the stored content upon request following commencement of said period.

In this way, a user can be provided with increased viewing flexibility, as it is possible to view content stored locally in a near on demand fashion. Furthermore, content providers are able to provide content not suited to the rigidity of a serial broadcast.

Preferably, the receiver/decoder comprises means (in the form of a processor and associated memory) for generating a display of guide data associated with forthcoming content to enable a user to select content for storage by the receiver/decoder upon receipt thereof. In this way, a user is provided with a more tailored viewing experience, as he may select which content he is interested in viewing.

Preferably, the generating means is arranged to generate the display in a format specified by a provider of said content. In this way, content providers are enabled to present their content to users more effectively, which may result in an enhanced service.

More preferably, said format may be specified by means received from the content provider for specifying said format.

According to another aspect of the invention, there is provided a receiver/decoder comprising: means (in the form of a receiver) for receiving from a content provider guide data associated with content provided by said content provider; means (in the form of a receiver) for receiving from said content provider means specifying a format specific to said content provider; and means (in the form of a processor and associated memory) for generating a display comprising said guide data arranged in said specified format. Advantageously, this may result in users having improved access to the content provided by a particular content provider.

In one embodiment, said means specifying a format comprises a template within which said guide data is arranged in said display. Thus, for example, the template may be in the form of an XML or HTML page, or set of pages, and the content provider may specify the style of the page(s) via a cascading style sheet (CSS) file. In one embodiment, the guide may thus be in the form of a walled garden.

In another embodiment, said means specifying a format comprises an application for arranging said guide data in said display. Thus for example, the content provider may provide an application suitable for displaying the guide to the content, such as a JAVA application.

Preferably, said display comprises a logo associated with the content provider. In this way a content provider may promote his brand or marks to users of the receiver/decoder together with the guide, which may increase public awareness of specific the content provider.

Preferably, said display comprises an advertisement in a dedicated portion thereof. Thus, a content provider may promote forthcoming attractions or provide promotional advertising.

Preferably, the guide data may comprise a textual display of data associated with said content. In this way a content provider may provide additional information which enhances the guide. For example, the content provider may provide summaries and/or reviews relating to the content listed in the guide.

Preferably, said guide data further comprises a plurality of images each associated with a respective item of content. For example, each image can comprise a still image from a respective movie or television programme.

In one embodiment, said generating means may be arranged to generate a display of said plurality of images in respective windows of a mosaic formation. This can provide the user with an attractive interface for selecting content to be stored on the receiver/decoder.

Preferably, said guide data comprises an indication of the period of availability of the content to the user.

Preferably, said generating means may be arranged to generate a cursor for display over said guide data, said cursor being selectively moveable in response to received user inputs to enable user selection of a portion of the displayed guide data.

Preferably, the receiver/decoder may comprise means (in the form of a processor and associated memory) for controlling storage of an item of content in response to user selection of a portion of the displayed guide data associated with that item. Thus, a user is provided with increased flexibility. This portion may comprise an icon, or an image associated with said content.

The receiving means may be arranged to receive a plurality of items of content, in which case said storage means is arranged to store those of the received items which have been selected for storage by the user. Thus, the storage of content which is of no interest to the user can be avoided.

Preferably, the receiver/decoder may comprise means (in the form of a processor and associated memory) for initiating the playback of, or access to, a stored item of content in response to a user request.

Preferably, the receiver/decoder may comprising means (in the form of a processor and associated memory) for charging a user's account upon playback of, or access to, said stored item of content. Thus, pay-per-view programmes or content may be provided. This may enable the content provider to generate revenue from users in a more direct manner.

Preferably, the amount of said charge varies during a period of availability of the stored item to the user. Thus, it may be possible to offer an item of content at a reduced rate towards the end of its period of availability. In this way, the content provider may promote the sale of content already stored on the receiver/decoder. The amount of the charge may also be dependent upon the number of times of previous user playback of, or access to, the stored item of content. In this way the content provider can seek to gain further revenue by offering, for example, repeat viewings of a stored movie at a reduced rate.

Preferably, said generating means is arranged to generate a display of content stored in said receiver/decoder. This can assist the user in selecting stored content for viewing, or access, and to delete stored content of no further interest to the user.

The receiving means may be arranged to receive a distribution list including said guide data. Such a distribution list may include means for identifying to the receiver/decoder whether storage of an item of content received thereby is compulsory. By designating content as "compulsory", the supplier can ensure that promotional content, such as a trailer for a forthcoming movie or an advertisement, is stored for viewing by the user. Preferably, the receiver/decoder comprises means for using said identifying means to control the compulsory storage of an item of content in the receiver/decoder.

Preferably, the receiver/decoder comprises means for compiling data relating to content stored in said storage means over a period of time, and for communicating said compiled data to a communications server. This can enable a content supplier to receive "feedback" relating to the habits of the user.

Preferably, the storage means is arranged to delete a stored item of content upon expiry of the period of availability of that stored item to the user. This can maximise the available capacity for storage of content. In this connection, the storage means may be arranged to delete a stored item of content upon request by the user and/or to delete a stored item of content upon user playback of, or access to, said stored item of content.

Preferably, the storage means comprises a hard disk. The content may be stored in a dedicated portion of said hard disk.

The receiver/decoder may comprise means for filtering received content according to a user's preferences, and the storage means may be arranged to automatically store filtered content. This can facilitate storage of content typically of interest to a particular user. The receiver/decoder may comprise means for generating a display for recommending to a user content for storage according to the user's preferences. The receiver/decoder may comprise means for determining a user's preferences from content previously selected by the user for storage.

The receiver/decoder may generate an alert if said storage means has insufficient storage capacity for storing received content. This can prompt a user to delete previously stored content in order to provide sufficient storage capacity for new content.

According to a further aspect of the invention, there is provided a system for providing content to a user, said system comprising a transmitter for transmitting content prior to commencement of a period of availability of said content to a receiver/decoder; and a receiver/decoder according to any preceding claim for receiving and storing said content, and enabling the user to access the stored content upon request following commencement of said period.

According to another aspect of the invention, there is provided an apparatus for transmitting content to a receiver/decoder, said apparatus comprising means (in the form of a transmitter) for transmitting to said receiver/decoder guide data for use by the receiver/decoder in generating a display for a forthcoming plurality of items of content for selected storage in the receiver/decoder, and for transmitting to said receiver/decoder each of said items of content to which said guide data relates for selected storage by the receiver/decoder prior to commencement of a period of availability of said items of content to a user.

Preferably, the transmitting means is arranged to transmit to the receiver/decoder at least one item of content for compulsory storage by the receiver/decoder. Preferably, each item of content includes an identifier for identifying to the receiver/decoder whether storage thereby is compulsory.

Preferably, the apparatus may further comprise means for receiving said guide data and said items of content from at least one content provider.

More preferably, said guide data may be included in a distribution list received from said content provider. The apparatus may comprise means for extracting from the distribution list at least one of an identifier and aversion identifier for the distribution list.

Preferably, the receiving means may be arranged to receive from said content provider means specifying a display format for said guide data for transmission to said receiver/decoder. Thus, according to another aspect of the invention; there is provided apparatus for transmitting content to a receiver/decoder, said apparatus comprising means (in the form of a receiver) for receiving from a content provider guide data for use by the receiver/decoder in generating a display for a plurality of items of content provided by said content provider, and for receiving from said content provider means specifying a display format for said guide data; and means (in the form of a transmitter) for transmitting to said receiver/decoder said guide data and said means specifying a display format for said guide data.

In known digital television broadcast systems, content providers pass Electronic Programme Guide (EPG) data to a Broadcast Centre which relays the EPG data, along with data received from other content providers, to receiver/decoders. The EPG data includes the time at which broadcast of each programme will commence. Such systems lack flexibility and may lead to inaccuracies should a broadcast schedule change at short notice or if programming from a particular content provider is subject to a delay. In addition, content providers are required to determine in advance of broadcast of content, the time at which the content will be broadcast.

Accordingly, in a preferred embodiment the apparatus comprises means for scheduling a time of transmission of an item of content to the receiver/decoder. This important feature is provided independently. Accordingly the invention further provides apparatus for transmitting content to a receiver/decoder, said apparatus comprising: means (in the form of a receiver) for receiving from a content provider a distribution list indicating to the apparatus an item of content to be received from the content provider for subsequent transmission to a receiver/decoder; and means (in the form of a processor and associated memory) for scheduling the time of transmission of the item of content to the receiver/decoder. This can reduce the error between the scheduled time and the actual time of broadcast of content. It may further result in the more efficient use of bandwidth.

Preferably, the apparatus may comprise means (in the form of a processor and associated memory) for extracting from the distribution list information relating to the item of content for use by the scheduling means in scheduling transmission of the item of content.

Preferably, the extracting means may be adapted to extract from the distribution list an identifier for the item of content. Such an identifier may be used to access efficiently both the item of content itself and other information relating to the item of content.

The extracting means may be adapted to extract from the distribution list information representing that the item of content is one of an item of audio/visual content, a data file, a game and an application. The apparatus can then manage the item of content in an appropriate manner.

Preferably, the extracting means may be adapted to extract from the distribution list information representing the size of the item of content. Such information can provide an easy means of determining the bandwidth required to transmit the item of content to receiver/decoders. The information could for example be the size in bytes of the item of content, or it could, particularly in the case of a movie, be the duration and average bit rate 1 of the movie data.

Preferably, the extracting means may be adapted to extract from the distribution list information representing a time period, specified by the content provider, during which the item of content is to be transmitted to the receiver/decoder.

More preferably, the extracting means may be adapted to extract a start time of the period, and one of an end date and a duration of the period. Using such information, a transmitting apparatus can schedule transmission of content having regard to a preference expressed by the content provider providing the content. For example, the content provider may state in the distribution list that the item of content should be transmitted at some time during the month of June.

Preferably, the extracting means may be adapted to extract from the distribution list information representing a frequency with which the content provider requires the content to be transmitted to the receiver/decoder. For example, the content provider may state in the distribution list that the item of content should be transmitted once every two weeks, and the transmitting apparatus may schedule transmission of the item of content accordingly.

Alternatively, the information may represent a priority assigned to the item of content by the content provider, the assigned priority being usable for the later allocation of a transmission frequency.

The apparatus may comprise means for extracting from the distribution list an identifier for the distribution list.

Preferably, the apparatus comprises means for extracting from the distribution list a version identifier for the distribution list. The inclusion of a version identifier may assist the transmitting apparatus in ensuring that only a current version of a distribution list is considered.

The apparatus may comprise means for transmitting to the receiver/decoder guide data associated with the item of content to be transmitted to the receiver/decoder. Preferably, the apparatus may be adapted to transmit scheduling information to the receiver/decoder. Also preferably, the apparatus may be adapted to transmit the distribution list to the receiver/decoder.

The apparatus may further comprise means for scheduling the time of transmission of the distribution list to the receiver/decoder.

The apparatus may further comprise means for extracting from the distribution list information representing a frequency with which the content provider requires the distribution list to be transmitted. For example, the distribution list may contain an indication that the broadcast centre should transmit the distribution list daily, weekly, monthly, and so on.

Preferably, the scheduling means may be adapted to add to the distribution list scheduling data representing the scheduled time of transmission of the item of content, thereby producing a scheduled distribution list.

Preferably, the transmitter means is arranged to transmit the scheduled distribution list to the receiver/decoder.

Preferably, the distribution list comprises genre information relating to a genre associated with the item of content. As described elsewhere, the distribution list may preferably be passed (preferably in amended form) by the transmission apparatus to a receiver/decoder. Such genre information may then be used by a user of the receiver/decoder to filter content information according to genre.

Preferably, the distribution list may comprise promotional data. More preferably, the distribution list may comprise promotional data relating to an item of content. Preferably, the promotional data may include a textual description of the item of content or a location of such a description. Also preferably, the promotional data includes a pictorial image relating to the item of content or a location of such an image. The inclusion of such material may allow a receiver/decoder receiving the distribution list to display a description and/or a still image related to the item of content to a user of a receiver/decoder.

The promotional data may relate to goods and/or services not provided by the content provider. In this way, a content provider can generate revenue by including in the distribution list advertisements for third party goods and/or services.

The distribution list may comprise an identifier therefor. Such an identifier can be useful to identifying the distribution list and, in preferred embodiments, the source of the list, and in referencing content items specified in it, in particular in systems in which more than one distribution list is in use simultaneously. In a list having both a distribution list reference identifier and a content reference identifier, an item of content may be uniquely identified by using both the distribution list reference identifier and the content reference identifier.

The distribution list may comprise means (in the form of a processor and associated memory) for representing to a receiver/decoder that the distribution list is to be stored thereon following receipt thereby.

Preferably, the distribution list may comprise means (in the form of a processor and associated memory) for representing to a receiver/decoder a frequency of transmission of the item of content as determined by the content provider.

Preferably, the distribution list comprises a version identifier.

The distribution list may comprise means for representing to a receiver/decoder a frequency of transmission of the distribution list as determined by the content provider. For example, the distribution list may contain an indication that the broadcast centre should transmit the distribution list daily, weekly, monthly, and so on.

According to another aspect of the invention, there is provided a distribution list for representing to transmission apparatus an item of content to be transmitted by the transmission apparatus to a receiver/decoder at a time to be scheduled by the transmission apparatus, and comprising information for use by the transmission apparatus in scheduling transmission of the item of content.

Preferably, the time period identifying information may comprise a start date of the period and one of an end date and a duration of the period commencing from the start date.

Preferably, the distribution list may comprise pricing information. The inclusion of pricing information may allow the distribution list to indicate to a user of a receiver/decoder the cost of consuming the item of content. Preferably, the pricing information indicates a cost of storing a distribution list on a receiver/decoder. Preferably, the pricing information may indicate a cost of storing the item of content on a receiver/decoder. For example, if the item of content is a movie, the pricing information may indicate the cost of storing the movie on the hard disk. More preferably, the pricing information may indicate a cost of a user accessing the item of content. The pricing may, for example, indicate the cost of listening to a music track, viewing a movie, running an application or playing a game, as the case may be. Also preferably, the pricing information may indicate a reduced cost for repeat access. Such information may help a content provider to drive sales of his content.

The distribution list may identify a plurality of items of content. The items of content may be of more than one type. For example, a list may identify a combination of at least one movie and/or at least one music track and/or at least one data file and/or at least one application and/or at least one game, and so on.

According to another aspect of the invention, there is provided scheduled distribution list for representing to a receiver/decoder an item of content to be transmitted to the receiver/decoder at a time to be scheduled by the transmission, and comprising information for use by the receiver/decoder in storing the item of content.

According to a further aspect of the invention, there is provided a method of providing content to a receiver/decoder, comprising transmitting a distribution list as described above to the receiver/decoder, transmitting an item of content to the receiver/decoder, receiving from the receiver/decoder a request for rights to access the item of content, and transmitting a signal representing the grant of the rights.

According to a further aspect of the invention, there is provided a user interface defining instruction for transmission to a receiver/decoder for the formatting of a user interface, the instruction comprising information provided by a content provider.

According to a further aspect of the invention, there is provided apparatus for managing a distribution list, comprising means for receiving a distribution list as described above, and means for storing the distribution list. Preferably, the apparatus comprises means for receiving content to which the distribution list relates and means for storing the content.

The present invention also provides a method of providing content to a user of a receiver/decoder, said method comprising the steps, at the receiver/decoder, of:
receiving content prior to commencement of a period of availability of said content to a user;
storing said content; and
enabling the user to access the stored content upon request following commencement of said period.

The present invention further provides a method of transmitting content to a receiver/decoder, said method comprising the steps of:
transmitting to said receiver/decoder guide data for use by the receiver/decoder in generating a display for a forthcoming plurality of items of content for selected storage in the receiver/decoder; and
transmitting to said receiver/decoder each of said items of content to which said guide data relates for selected storage by the receiver/decoder prior to commencement of a period of availability of said items of content to a user.

The term "content" as used herein may connote matter for distribution to receiver/decoders. In particular, the term preferably includes audio/visual matter (for example, movies, advertisements, video clips, television programmes, music tracks, radio plays and other radio programming, and the like), and data (including application data and gaming data). The terms "item of content", "content provider" and "access" when used in relation to content, should be construed accordingly.

The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio/visual components making up a television programme.

The term "command" as used herein preferably connotes a physical manifestation of a software routine programmed to carry out a specified function, preferably in the form of electrical impulses in a memory or in a more permanent form, such as a recording of the routine on a suitable data carrier, for example. Preferably the manifestation of the routine is immediately executable by a processor, being stored as object code, for example. The term may also be extended to cover the actual invocation of such a routine, either in the form of a physically-embodied instruction to execute the routine, or as an actual signal—such as a remote procedure call (RPC)—designed to cause the routine to execute.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

The term "content" as used herein may connote matter for distribution to receiver/decoders. In particular, the term preferably includes audio/visual matter (for example, movies, advertisements, video clips, television programmes, music tracks, radio plays and other radio programming, and the like), and data (including application data and gaming data). The terms "item of content", "content provider" and "access" when used in relation to content, should be construed accordingly.

The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio/visual components making up a television programme.

The term "command" as used herein preferably connotes a physical manifestation of a software routine programmed to carry out a specified function, preferably in the form of electrical impulses in a memory or in a more permanent form, such as a recording of the routine on a suitable data carrier, for example. Preferably the manifestation of the routine is immediately executable by a processor, being stored as object code, for example. The term may also be extended to cover the actual invocation of such a routine, either in the form of a physically-embodied instruction to execute the routine, or as an actual signal—such as a remote procedure call (RPC)—designed to cause the routine to execute.

Any feature in one aspect of the invention may be applied to other aspects of the invention, in any appropriate combination. In particular, method aspects may be applied to apparatus aspects, and vice versa. Also, individual features of the system may be provided independently or in any appropriate combination.

In particular, the invention can provide independently and/or in any combination a distribution list manager, a distribution list, a content provider/broadcast centre interface, methods of transmitting content and/or a scheduled distribution list and/or an announcement and/or a data representative of a user interface to a receiver/decoder, software for a receiver/decoder, a scheduled distribution list and a user interface.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

FIG. 10 shows a distribution list for a content push service;

FIG. 11 illustrates the organisation of editorial data;

SYSTEM OVERVIEW

Figure 1:
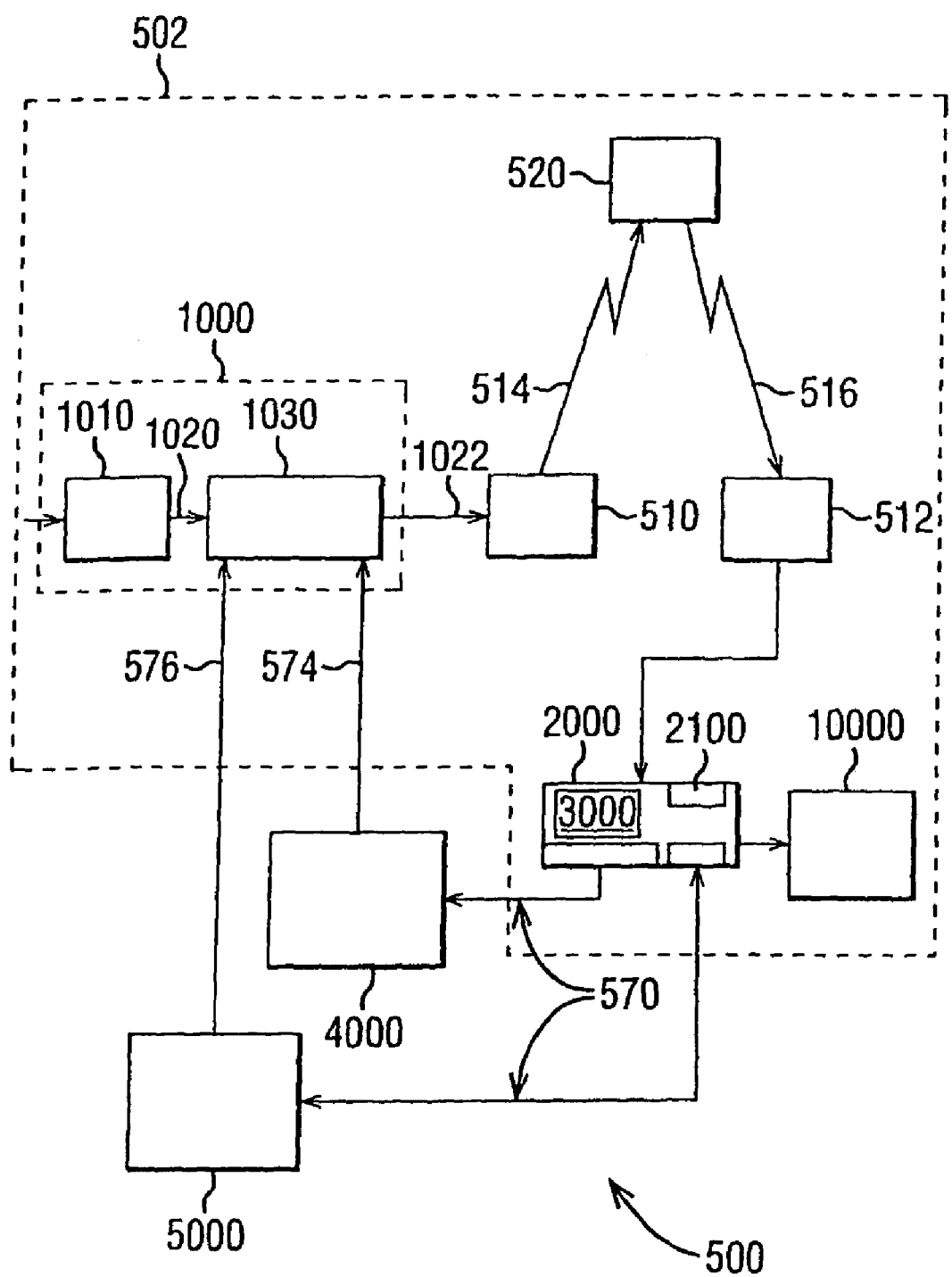
FIG. 1 is an overview of a satellite digital television system.

An overview of a digital television system 500 is shown in FIG. 1. As will be discussed below, the system 500 comprises a broadcast centre 1000, a receiver/decoder 2000, a software/hardware architecture 3000 of the receiver/decoder, an interactive system 4000, and a conditional access system 5000, as will all be discussed below.

The system 500 includes a mostly conventional digital television system 502 that uses the known MPEG-2 compression system to transmit compressed digital signals. In more detail, MPEG-2 compressor 1010 in a broadcast centre 1000 receives a digital signal stream (typically a stream of video signals). The compressor 1010 is connected by linkage 1020 to a multiplexer and scrambler 1030.

The multiplexer 1030 receives a plurality of further input signals, assembles the transport stream and transmits compressed digital signals to a transmitter 510 of the broadcast centre via linkage 1022, which can of course take a wide variety of forms including telecommunications links. The transmitter 510 transmits electromagnetic signals via uplink 514 towards a satellite transponder 520, where they are electronically processed and broadcast via notional downlink 516 to earth receiver 512, conventionally in the form of a dish owned or rented by the end user. Other transport channels for transmission of the data are of course possible, such as terrestrial broadcast, cable transmission, combined satellite/cable links, telephone networks etc.

The signals received by receiver 512 are transmitted to an integrated receiver/decoder 2000 owned or rented by the end user and connected to the end user's television set 10000. The receiver/decoder 2000 decodes the compressed MPEG-2 signal into a television signal for the television set 10000. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In the receiver/decoder 2000'a hard disk 2100 is provided, on which audio/visual and other data can be stored. This allows advanced recording and playback facilities for programmes received by the receiver/decoder, and also allows large amounts of other types of data, such as electronic programme guide data, to be stored in the receiver/decoder.

A content management and protection system (CMPS) 2300 (not shown) in the receiver/decoder provides the ability securely and flexibly to control the recording and playback of data on the hard disk 2100 (or other storage device).

In a multichannel system, the multiplexer 1030 handles audio/visual information received from a number of parallel sources and interacts with the transmitter 510 to broadcast the information along a corresponding number of channels. In addition to audio/visual information, messages or applications or any other sort of digital data may be introduced in some or all of these channels interlaced with the transmitted digital audio/visual information.

An interactive system 4000 is connected to the multiplexer 1030 and the receiver/decoder 2000, and is located partly in the broadcast centre and partly in the receiver/decoder. It enables the end user to interact with various applications via a back channel 570. The back channel may be, for example a Public Switched Telephone Network (PSTN) channel (for example, a modemmed back channel) or an Out of Band (OOB) channel.

A conditional access system 5000, also connected to the multiplexer 1030 and the receiver/decoder 2000 and again located partly in the broadcast centre and partly in the receiver/decoder, enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2000. Using the receiver/decoder 2000 and smartcard, the end user may purchase commercial offers in either a subscription mode or a pay-per-view mode. Typically this is achieved using the back channel 570 which is used by the interactive system 4000.

As mentioned above, programmes transmitted by the system are scrambled at the multiplexer 1030, the conditions and encryption keys applied to a given transmission being determined by the access control system 5000. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 2000 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

Figure 2:
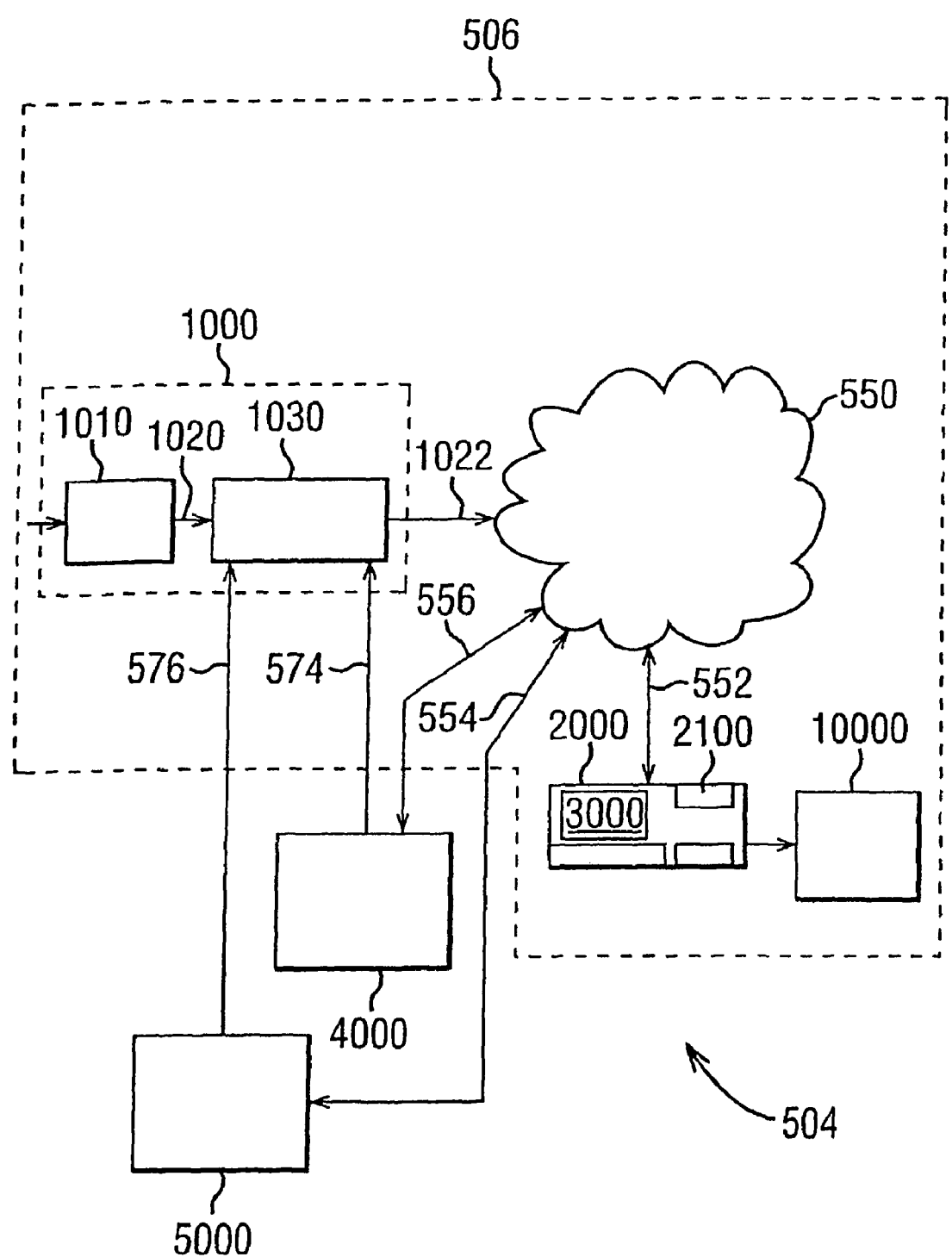
FIG. 2 is an overview of a cable digital television system.

FIG. 2 illustrates an alternative embodiment of a digital television system 504, utilising a cable network as the broadcast medium for the compressed digital signals. In this figure, like parts are indicated with like numerals.

The satellite transponder and transmitting and receiving stations are replaced by a cable network 550. Additionally, in this particular embodiment, the modemmed back channel between the receiver/decoder 2000 and the interactive system 4000 and conditional access system 5000 is removed, replaced by linkages 554, 556 between the cable network 550 and the conditional access system 5000 and interactive system 4000 respectively. The receiver/decoder 2000 thus communicates with the other systems via the cable network 550, utilising a cable modem or other means to allow it to send and receive data via the same link as it receives data from the broadcast centre.

The cable network 550 may be any form of wide area network (WAN), such as a dedicated connection, the internet, local cable distribution network, wireless connection, or any combination of the above. In the present embodiment, the hybrid fibre coax (HFC) network is used. It is appreciated that the various means of communication between the receiver/decoder 2000 and the other components of the television system are interchangeable.

Conditional Access System

Figure 3:
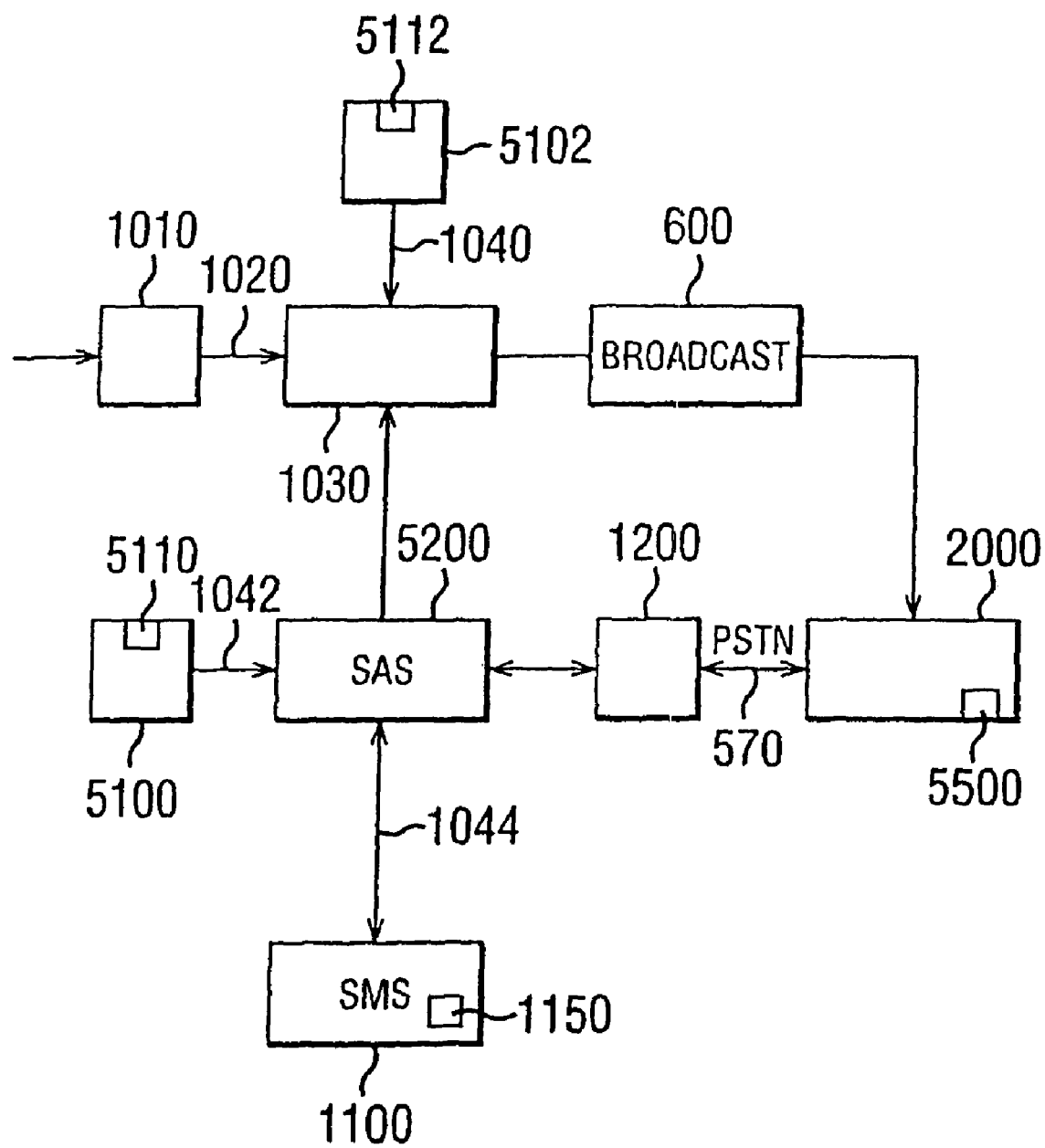
FIG. 3 is an overall system view, with the head-end shown in more detail.

With reference to FIG. 3, in overview the conditional access system 5000 includes a Subscriber Authorization System (SAS) 5200. The SAS 5200 is connected to one or more Subscriber Management Systems (SMS) 1100, one SMS for each broadcast supplier, by a link 1044, which may be a TCP-IP link or other type of link. Alternatively, one SMS could be shared between two commercial operators, or one operator could use two SMSs, and so on.

First encrypting units in the form of ciphering units 5100 utilising "mother" smartcards 5110 are connected to the SAS by linkage 1042. Second encrypting units again in the form of ciphering units 5102 utilising mother smartcards 5112 are connected to the multiplexer 1030 by linkage 1040. The receiver/decoder 2000 receives a "daughter" smartcard 5500. The receiver/decoder is connected directly to the SAS 5200 via communications servers 1200 and the modemmed back channel 570. The SAS sends amongst other things subscription rights to the daughter smartcard on request.

In variants of the preferred embodiment, internet or cable connections either complement or replace the PSTN 570 and communications servers 1200.

The smartcards contain confidential information from one or more commercial operators. The "mother" smartcard encrypts different kinds of messages and the "daughter" smartcards decrypt the messages, if they have the rights to do so.

With reference to FIG. 3, in the broadcast centre, the digital video signal is first compressed (or bit rate reduced), using the MPEG-2 compressor 1010. This compressed signal is then transmitted to the multiplexer and scrambler 1030 in order to be multiplexed with other data, such as other compressed data.

The scrambler generates a control word used in the scrambling process and included in the MPEG-2 stream in the multiplexer 1030. The control word is generated internally and enables the end user's integrated receiver/decoder 2000 to descramble the programme.

Access criteria, representing how the programme is commercialised, are also passed to the multiplexer and scrambler 1030. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM). This is a message sent in relation with one scrambled program; the message contains a control word (which allows for the descrambling of the program) and the access criteria of the broadcast program. The access criteria and control word are transmitted to the second encrypting unit 5102 via the linkage 1040. In this unit, an ECM is generated, encrypted and transmitted on to the multiplexer and scrambler 1030.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM may be required, or, alternatively, the same control word may be used to scramble each component, and only a single ECM is required.

The multiplexer 1030 receives electrical signals comprising encrypted EMMs from the SAS 5200, encrypted ECMs from the second encrypting unit 5102 and compressed programmes from the compressor 1010. The multiplexer 1030 scrambles the programmes and transmits the scrambled programmes, the encrypted EMMs and the encrypted ECMs as electric signals to broadcast system 600, which may be for example a satellite system as shown in FIG. 1, or other broadcast system. The receiver/decoder 2000 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 2000 extracts the corresponding ECM from the MPEG-2 stream and passes the ECM to the "daughter" smartcard 5500 of the end user. This slots into a housing in the receiver/decoder 2000. The daughter smartcard 5500 controls whether the end user has the right to decrypt the ECM and to access the programme. If not, a negative status is passed to the receiver/decoder 2000 to indicate that the programme cannot be descrambled. If the end user does have the rights, the ECM is decrypted and the control word extracted. The decoder 2000 can then descramble the programme using this control word. The MPEG-2 stream is decompressed and translated into a video signal for onward transmission to television set 10000.

If the programme is not scrambled, no ECM will have been transmitted with the MPEG-2 stream and the receiver/decoder 2000 decompresses the data and transforms the signal into a video signal for transmission to television set 10000.

The subscriber management system (SMS) 1100 includes a database 1150 which manages, amongst others, all of the end user files, commercial offers (such as tariffs and promotions), subscriptions, PPV details, and data regarding end user consumption and authorization. The SMS may be physically remote from the SAS.

The SMS 1100 transmits messages to the SAS 5200 which imply modifications to or creations of Entitlement Management Messages (EMMs) to be transmitted to end users. The SMS 1100 also transmits messages to the SAS 5200 which imply no modifications or creations of EMMs but imply only a change in an end user's state (relating to the authorization granted to the end user when ordering products or to the amount that the end user will be charged). The SAS 5200 also sends messages (typically requesting information such as call-back information or billing information) to the SMS 1100, so that it will be apparent that communication between the two is two-way.

Receiver/Decoder

Figure 4:
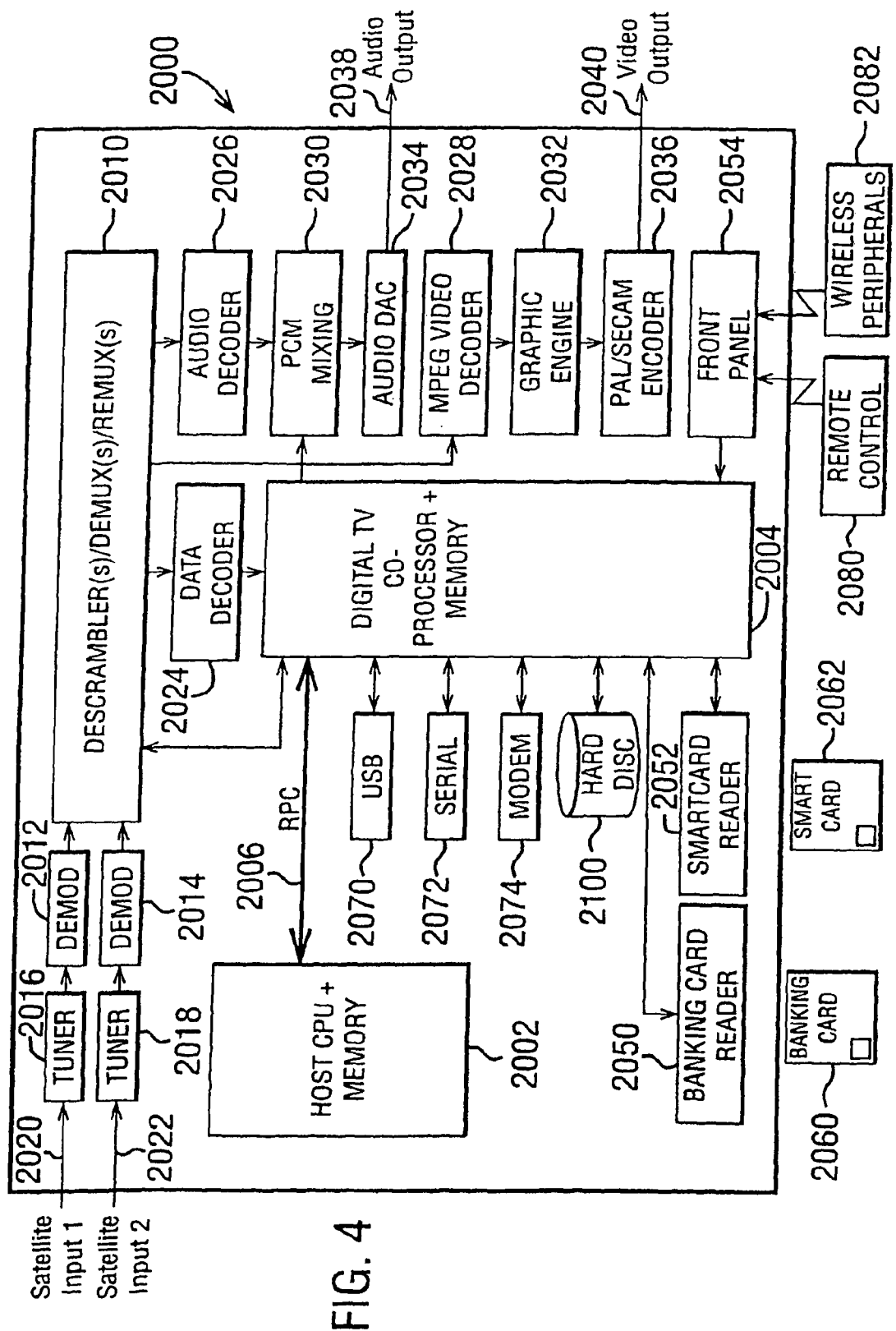
FIG. 4 is a schematic of the component architecture of the receiver/decoder.

Referring to FIG. 4, the various elements of receiver/decoder 2000 will now be described in terms of functional blocks.

The receiver/decoder 2000, which may be, for example, a digital set-top box (DSTB), comprises a central host processor 2002 and a digital TV coprocessor 2004, both having associated memory elements (not shown) and joined by a coprocessor bus 2006. The coprocessor 2004 is adapted to receive input data from a USB interface 2070, a serial interface 2072, a parallel interface (not shown), a modem 2074 (connected to the modem back channel 570 of FIG. 1), and switch contacts on the front panel 2054 of the decoder.

The receiver/decoder is additionally adapted to receive inputs from an infra-red remote control 2080 (and optionally from other wireless peripherals 2082 such as Bluetooth-enabled devices) and also possesses two card readers 2050, 2052 adapted to read bank and subscription smartcards 2060, 2062 respectively. The subscription smartcard reader 2052 engages with an inserted subscription card 2062 and with a conditional access unit (not shown) to supply the necessary control word to a demultiplexer/descrambler/remultiplexer unit 2010 to enable the encrypted broadcast signal to be descrambled. The decoder also includes a conventional tuner 2016 and demodulator 2012 to receive and demodulate the satellite transmission before being filtered and demultiplexed by the demodulator/descrambler unit 2010. A second tuner 2018 and second demodulator 2014 are also provided, to allow, amongst other things, a second channel to be received and decoded in parallel with the first.

A hard disk 2100 is also provided, allowing storage of programme and application data received and generated by the receiver/decoder. In conjunction with the two tuners 2016, 2018, two demodulators 2012, 2014, the descrambler/demultiplexer/remultiplexer 2010, and the data decoder 2024 and audio decoder 2026, advanced recording and playback features are provided, allowing simultaneous recordings of one or more programmes while a further programme is being viewed, and more general transfers to and from the hard disk to and from the display devices and/or inputs and outputs, all occurring in parallel.

The audio output 2038 and video output 2040 in the receiver/decoder are fed by the PCM mixer 2030 and audio DAC 2034, and the MPEG video decoder 2028, graphic engine 2032 and PAL/SECAM encoder 2036 respectively. Alternative or complementary outputs may of course be provided.

As used in this description, an application is preferably a piece of computer code for controlling high level functions of preferably the receiver/decoder 2000. For example, when the end user positions the focus of remote control 2080 on a button object seen on the screen of the television set (not shown) and presses a validation key, the instruction sequence associated with the button is run. Applications and the associated middleware are executed by the host processor 2002, with remote procedure calls (RPCs) being made to the digital TV coprocessor 2004 across the coprocessor bus 2006 as and when required.

An interactive application proposes menus and executes commands at the request of the end user and provides data related to the purpose of the application. Applications may be either resident applications, that is, stored in ROM (or FLASH or other non-volatile memory) of the receiver/decoder 2000, or broadcast and downloaded into RAM, FLASH memory or the hard disk of the receiver/decoder 2000.

Applications are stored in memory locations in the receiver/decoder 2000 and represented as resource files. The resource files comprise graphic object description unit files, variables block unit files, instruction sequence files, application files and data files.

The receiver/decoder contains memory (not shown) divided into at least one RAM volume, a FLASH volume and at least one ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 5:
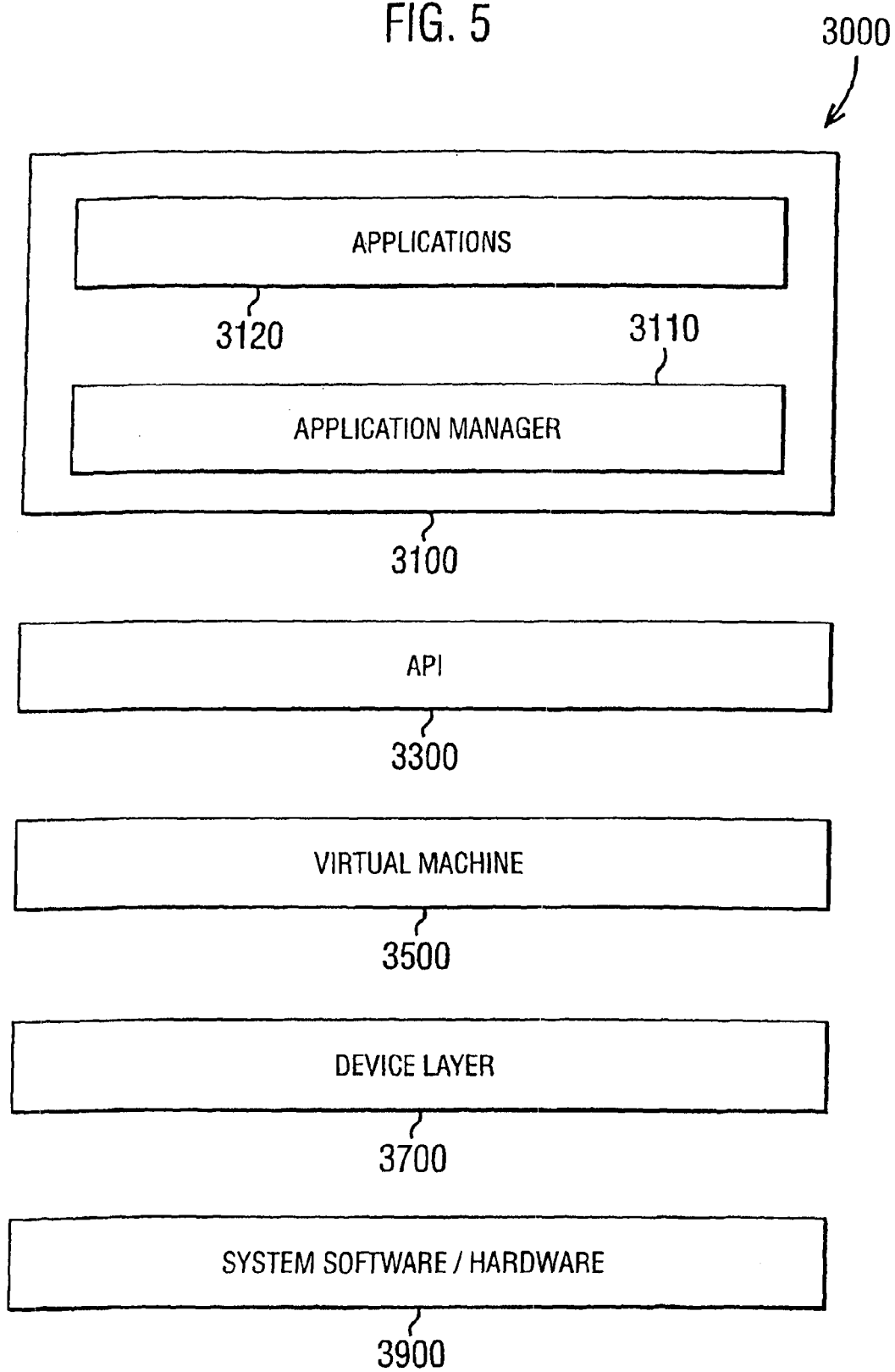
FIG. 5 is a diagram of the software architecture of the receiver/decoder.

With reference to FIG. 5, the software/hardware architecture 3000 of the receiver/decoder contains five software layers, organized so that the software can be implemented in any receiver/decoder and with any operating system. The various software layers are application layer 3100, application programming interface (API) layer 3300, virtual machine layer 3500, device interface layer 3700 (often abbreviated just to 'device layer') and system software/hardware layer 3900.

The application layer 3100 encompasses applications 3120 that are either resident in or downloaded to the receiver/decoder. They may be interactive applications used by customers, written in, for example, Java, HTML, MHEG-5 or other languages, or they may be applications used by the receiver/decoder for other purposes, for example for running such interactive applications. This layer is based on a set of open Application Programming Interfaces (APIs) provided by the Virtual Machine layer. This system allows applications to be downloaded to the hard disk, flash memory or RAM memory in the receiver/decoder on-the-fly or on demand. The application code can be transmitted in compressed or uncompressed format using protocols such as Data Storage Media Command and Control (DSMCC), Network File Server (NFS) or other protocols.

The API layer 3300 provides high-level utilities for interactive application development. It includes several packages that make up this high-level API. The packages provide all the functionality necessary to run interactive applications. The packages are accessible by the applications.

In a preferred embodiment the API is adapted for applications written in the Java, PanTalk or such similar programming languages. Furthermore, it can facilitate the interpretation of HTML and other formats, such as MHEG-5. Besides these features, it also includes other packages and service modules that are detachable and extensible as requirements dictate.

The virtual machine layer 3500 is composed of language interpreters and various modules and systems. This layer, managed by a kernel 3650 (see FIG. 6), consists of everything necessary to receive and execute interactive applications in the receiver/decoder.

The device interface layer 3700 includes a Device Manager and software devices (generally referred to herein as just 'devices'). Devices are software modules which consist of the logical resources necessary for management of external events and physical interfaces. The device interface layer, under the control of the Device Manager, manages communication channels between drivers and applications and provides enhanced error exception checking. Some examples of managed (hardware) devices are: card readers 3722 (not shown), modems 3730 (not shown), network 3732 (not shown), PCMCIA (Personal Computer Memory Card International Association), LED display and so on. Programmers do not have to deal with this layer directly, since the API layer controls the devices from above.

The system software/hardware layer 3900 is provided by the manufacturer of the receiver/decoder. Because of the modularity of the system and because services supplied by the higher-level operating system (such as event scheduling and memory management) are part of the virtual machine and kernel, the higher layers are not tied to a particular real-time operating system (RTOS) or to a particular processor.

Typically the virtual machine layer 3500, occasionally in combination with the device interface layer 3700 and/or API 3300, is referred to as the 'middleware' of the receiver/decoder.

Figure 6:
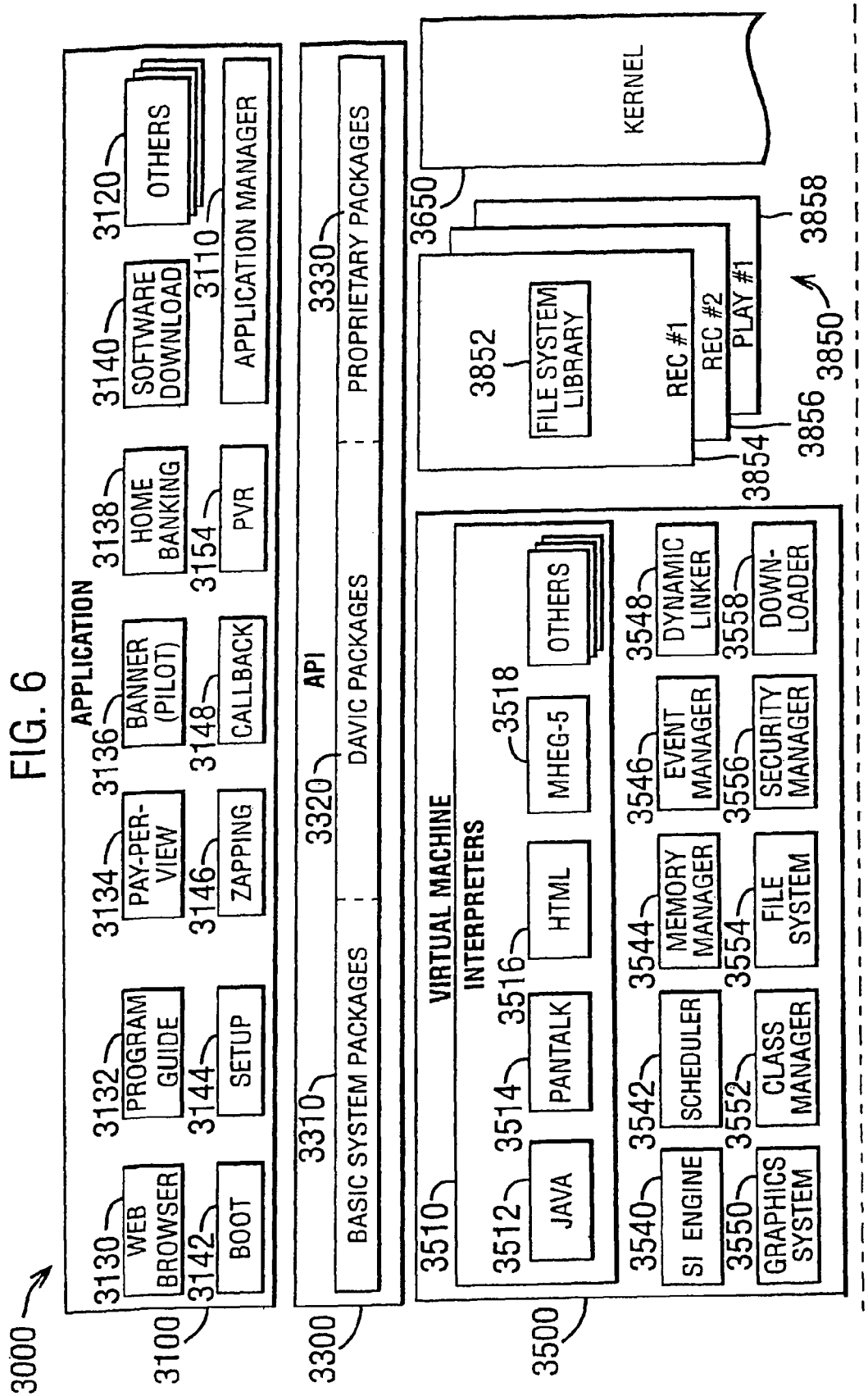
FIG. 6 is a diagram showing the top half of FIG. 5 in more detail.

With reference to FIG. 6 the software architecture of the receiver/decoder 3000 corresponding to the top half of FIG. 5 (comprising the application layer 3100, API layer 3300 and virtual machine layer 3500) will now be described in more detail.

Interactive applications are applications that the user interacts with, for example, to obtain products and services, such as electronic program guides, telebanking applications and games.

There are two types of application in the application layer 3100, plus the Application Manager 3110. There are interactive applications such as a Web Browser 3130 which can be added at any time as long as they conform to the API 3300, and there are resident applications which manage and support the interactive applications. The resident applications are substantially permanent and include the following:

Boot. The Boot application 3142 is the first application launched when the receiver/decoder is powered on. The Boot application first starts the Application Manager 3110, and then starts the "Manager" software modules in the virtual machine 3500, such as the Memory Manager 3544 and the Event Manager 3546.

Application Manager. The Application Manager 3110 manages the interactive applications that are run in the receiver/decoder, that is, it starts; stops, suspends, resumes, handles events and deals with communication between applications. It allows multiple applications to run at once, and thus is involved in the allocation of resources among them. This application is completely transparent to the user.

SetUp. The purpose of the SetUp application 3144 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 3146 is used to change channels using the Program-up, Program-down and numeric keys. When another form of zapping is used, for example, through a banner (pilot) application, the Zapping application is stopped.

Callback. The Callback application 3148 is used to extract the values of various parameters stored in the receiver/decoder memory and return these values to the commercial operator via modemmed back channel 1070 (not shown), or by other means.

Other applications in the application layer 3100 include a program guide application 3132, a pay-per-view application 3134, a banner (pilot) application 3136, a home banking application 3138, a software download application 3140 and a PVR (personal video recorder) application 3154 (see below).

As noted above, the Application Programming Interface (API) layer 3300 contains several packages. These include basic system packages 3310, used, for example, to access basic features of the virtual machine, DAVIC packages 3320, and proprietary packages 3330, used to access features of the software architecture unique to the principal software vendor.

Considered in more detail, the virtual machine 3500 includes the following:

Language Interpreters 3510. Different interpreters can be installed to conform to the type of applications to be read. These include Java interpreters 3512, PanTalk interpreters 3514, HTML interpreters 3516, MHEG-5 interpreters 3518 and others.

Service Information (SI) Engine. The SI Engine 3540 loads and monitors common Digital Video Broadcasting (DVB) or Program System Information Protocol (PSIP)

tables and puts them into a cache. It allows access to these tables by applications which need the data contained in them.

Scheduler 3542. This module allows for pre-emptive, multithreaded scheduling with each thread having its own event queue.

Memory Manager 3544. This module manages the access to memory. It also automatically compresses data in memory when necessary and performs automatic garbage collection.

Event Manager 3546. This module allows events to be triggered according to priority. It manages timer and event grabbing and allows applications to send events to each other.

Dynamic Linker 3548. This module allows the resolution of addresses arising from native Java functions, loads native methods from a Java class downloaded into RAM and resolves calls from downloaded native codes towards ROM.

Graphics System 3550. This system is object-orientated and optimized. It includes graphic window and object management as well as a vectorial font engine with multi-language support.

Class Manager 3552. This module loads classes and resolves any class referencing problems.

File System 3554. This module is compact and optimized to manage a hierarchical file system with multiple ROM, flash, RAM and DSMCC volumes. Flash integrity is guaranteed against any incidents.

Security Manager 3556. This module authenticates applications and controls the access of applications to sensitive memory and other zones of the set-top box.

Downloader 3558. This module uses automatic data loading from a remote DSMCC carousel or through the NFS protocol, with downloaded files accessed in the same way as resident ones. Memory clear-up, compression and authentication are also provided.

Furthermore, the DAVIC resource notification model is supported so that client resources are efficiently managed.

A kernel 3650 manages the various different processes running in the virtual machine 3500 and device interface layer 3700 (not shown). For efficiency and reliability reasons, the kernel implements relevant parts of the POSIX standard for operating systems.

Under control of the kernel, the virtual machine (running Java and Pantalk applications) runs in its own thread, separate to other 'server' elements of the operating system, such as the mass storage server 3850 (not shown). Corresponding provisions, such as requiring Thread IDs to be passed as parameters in system calls, are also made in the API layer 3300 to allow the applications 3120 to benefit from the multithreaded environment.

By providing multiple threads, more stability can be achieved. For example, if the virtual machine 3500 ceases to operate for some reason, by suffering a crash or being blocked for a long time by an application trying to access a device, other time-critical parts of the system, such as the hard disk server, can continue to operate.

As well as the virtual machine 3500 and kernel 3650, a hard disk video recorder (HDVR) module 3850 is provided for handling the recording and playback functions of the hard disk 2210 or other attached mass storage component. The server comprises two separate threads 3854, 3856 handling recording, one thread 3858 for handling playback, and a file system library 3852 for interfacing with the mass storage components.

An appropriate one of the threads 3854, 3856, 3858 in the hard disk video recorder (HDVR) 3850 receives commands (such as a command to start recording a particular programme) from clients such as the personal video recorder (PVR) application 3154, in response to the user pressing a 'record' button, for example.

In turn, the thread in question then interacts with the service device 3736 (shown in FIG. 7) to set up and synchronise the parts of the receiver/decoder handling the bitstream to be recorded or played back. In parallel, the thread also interacts with the file system library 3852 to coordinate the recording or playback operation at appropriate places on the hard disk 2210 (not shown).

The file system library 3852 then sends commands to the mass storage device 3728 (also shown in FIG. 7) which tell the mass storage device 3728 which sub-transport stream (STS) to transfer (via a FIFO buffer), and on which hard disk target the stream should be stored. Allocation of clusters on the hard disk and general file management is carried out by the file system library 3852, the mass storage device itself being concerned with lower level operations.

The service device 3736 mentioned above is unique amongst the devices in that it does not relate to a physical component of the receiver/decoder. It instead provides a high level interface which groups together in a single 'instance' the various sets of tuner, demultiplexer, remultiplexer and hard disk devices in the receiver/decoder, freeing higher level processes from the difficulties of coordinating the various sub-devices.

Figure 7:
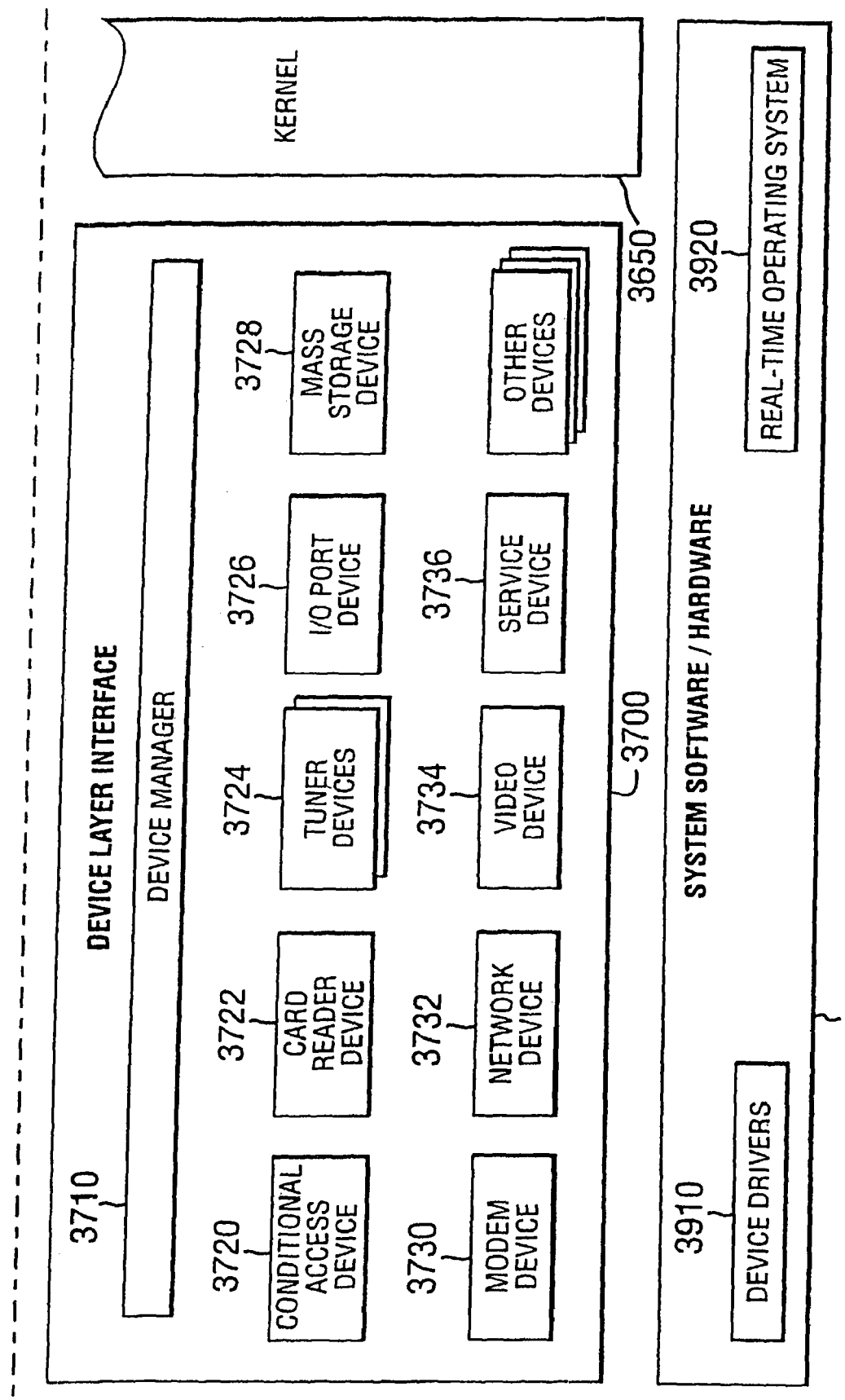
FIG. 7 is a diagram showing the bottom half of FIG. 5 in more detail.

With reference to FIG. 7 the software architecture of the receiver/decoder 3000 corresponding to the bottom half of FIG. 5 (comprising the device interface layer 3700 and the system software and hardware layer 3900) will now be described in more detail.

Further devices provided in the device layer include the conditional access device 3720, tuner devices 3724 corresponding to the two (or potentially more) tuners 2016, 2018 of FIG. 4, the video device 3734, the I/O port device 3726, and the service device 3736 and mass storage device 3728 mentioned above.

In broad terms, a device can be regarded as defining a logical interface, so that two different devices may be coupled to a common physical port. Certain devices may communicate among themselves, and all devices also operate under the control of the kernel 3650.

Before using the services of any device, a program (such as an application instruction sequence) has to be declared as a "client", that is, a logical access-way to the device or the device manager 3710. The manager gives the client a client number which is referred to in all accesses to the device. A device can have several clients, the number of clients for each device being specified depending on the type of device. A client is introduced to the device by a procedure "Device: Open Channel". This procedure assigns a client number to the client. A client can be taken out of the device manager 3710 client list by a procedure "Device: Close Channel".

The access to devices provided by the device manager 3710 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used. This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

Figure 8:
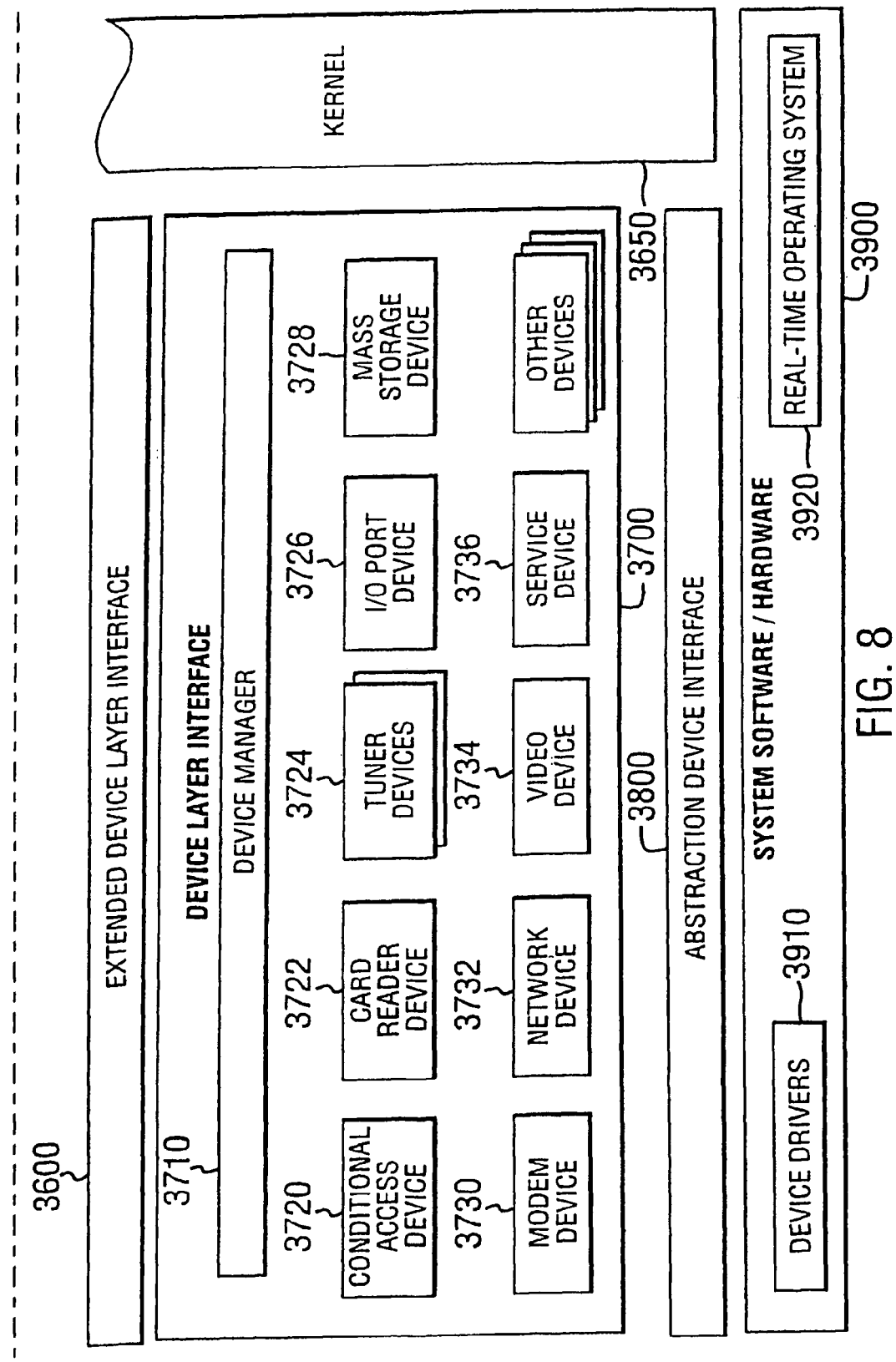
FIG. 8 is a diagram showing an alternative embodiment of the bottom half of FIG. 5.

In a second embodiment of the receiver/decoder, the lower half of the architecture of the receiver/decoder is replaced by the layers shown in FIG. 8.

In this embodiment, an extended device layer interface (EDLI) 3600 is provided between the virtual machine 3500 (not shown) and the device interface layer 3700, and an abstraction device interface 3800 is provided between the device interface layer 3700 and the system software/hardware layer 3900. Otherwise, like parts are indicated with like reference numerals.

The extended device layer interface (EDLI) 3600 provides a dedicated interface between the virtual machine 3500 and the device interface layer 3700 and generally provides multithreading support to the device interface layer. Functions of the EDLI include routing asynchronous events to the appropriate thread in the middleware (since the device interface layer need not itself support multithreading) and routing messages between threads.

The abstraction device interface 3800 provides a further interface between the device interface layer 3700 and the device drivers 3910 in the system software/hardware layer 3900. By providing such an interface, the large and complex device layer 3700 can be made hardware independent to a greater degree.

Content Push Service—General Overview

Figure 9:
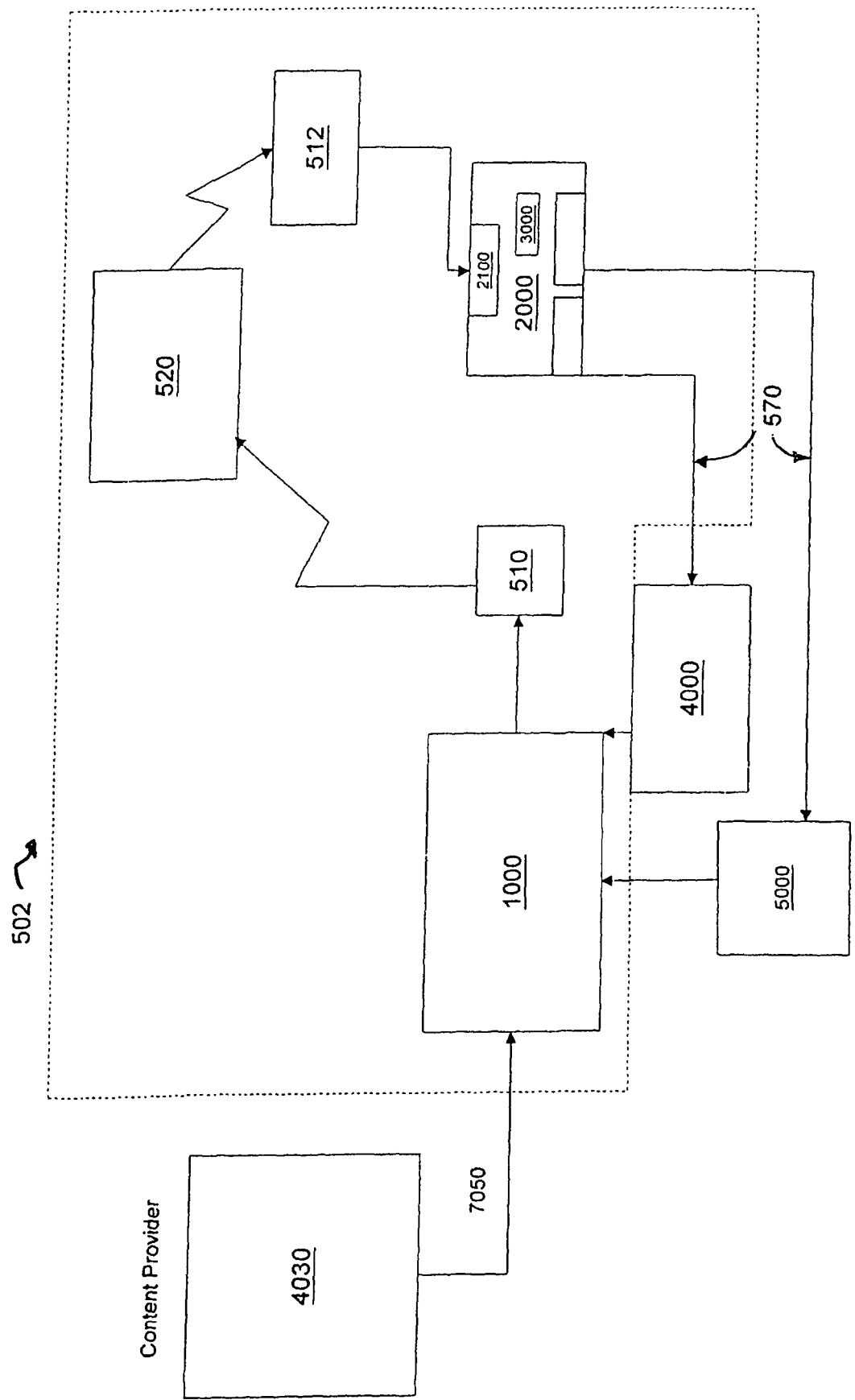
FIG. 9 is an overview of a further satellite digital television system.

With reference now to FIG. 9, a content push service "pushes" content (as herein defined) to receiver/decoders, that is, the content is broadcast to the receiver/decoder for storage on the hard disk 2100 and subsequent access therefrom by the user, even though storage thereof has not necessarily been requested by the user. In a preferred embodiment, the content may be accessible by the user for a predetermined time period. The content may include content from more than one content provider; however, in the preferred embodiment, each content push service pushes content provided by a single content provider 4030.

A content provider wishing to provide a content push service generates a list, known as a distribution list, which contains information defining certain features of the content push service; the distribution list is described in further detail later. The distribution list, the content to be pushed and any additional resource data (also described in more detail later) are provided by the content provider 4030 (of FIG. 9) to the broadcast centre 1000.

Once the broadcast centre 1000 has received the distribution list from the content provider, it schedules broadcast sessions during which the content will be pushed to receiver/decoders. Before pushing the content, the broadcast centre 1000 compiles information regarding the scheduling of the transmission of content with the information contained in the distribution list into a scheduled distribution list (described in more detail below).

The scheduled distribution list is similar to the distribution list, but it also contains information added by the TV operator at the broadcast centre 1000, such as how the content is to be delivered to the receiver/decoders (that is, the timing of the broadcast sessions, which content is to be broadcast and so on). The scheduled distribution list is transmitted to the receiver/decoders to allow user access to the content push service.

The information contained within the scheduled distribution list is presented to the user by means of a receiver/decoder user interface (herein known as the Service Guide Interface). The receiver/decoder generates the Service Guide Interface (as described in more detail later) for display on television 10000 to provide a user with information regarding the content to be pushed, for example, the title and date from which the content will be available to the user. If a user wishes to access a particular content item from the content listed in the Service Guide, the user communicates this to the receiver/decoder, for example by pressing a key on a remote control 2080. When the content is pushed, the content items which the user has chosen are stored on the hard disk, while the rest of the content is ignored.

Content push services may be optional or mandatory. An optional service is a service for which registration by the user (as described below) is required; without registration to an optional service, no content provided by that service will be stored on the hard disk 2100 of the user's receiver/decoder.

A mandatory service is one for which registration is effected automatically by the user's receiver/decoder (as described below).

Additionally, content within a content push service may also be optional or mandatory. Optional content is not stored on the hard disk 2100 of a user's receiver/decoder without intervention by the user (either directly by selecting the content, or indirectly by entering preferences via the preferences module 3120 described below).

Mandatory content is automatically stored on the hard disk of a user's receiver/decoder provided that the service in which the mandatory content is provided is one to which the receiver/decoder is registered.

After content has been pushed by the broadcast centre and the mandatory content and the chosen optional content have been stored on the hard disk of a receiver/decoder (as described below), that content may be accessed by the user. In a preferred embodiment, the user may commence access of an item of the stored content upon request during the period of availability of that item of stored content (for example, playback of a music track or a movie, or launching an application or a game) by selecting that item of content from the Service Guide Interface for the corresponding content push service.

Various examples of the above-mentioned and further aspects of content push services, and the manner in which they are made available to users, are described below.

The Role of the Content Provider

The content provider is the entity which provides content for broadcasting to receiver/decoders. When creating a content push service, the content Provider selects one or more items of content which he wishes to be able to pre-position on the hard disk of users' receiver/decoders for access in a virtual on demand manner (that is to say that, after delivery of the content to the receiver/decoder, the user may access it upon request within the period of availability of the content).

The type of content which a content provider may wish to provide using such a model is not limited to audio/visual content (for example, television programmes, advertisements and movies). A content provider may additionally or alternatively wish to pre-position music or other audio tracks, applications, data files and computer games for later on-demand access. In particular, a content provider may wish to provide in a content push service revenue-generating content (that is to say, content for which user rights must be purchased by the user before the content can be accessed by the user).

Furthermore, the content provider may wish to tie-in with some content additional content (for example, advertisements for future content, or from the providers of other goods or services who have paid the content provider to position advertisements on the receiver/decoders of users).

Additionally the content provider may wish to provide users with a user interface to the content contained in the content push service, rather than allowing the content to be displayed in a resident interface style, such as the Electronic Programme Guide of known receiver/decoders.

The Distribution List

As mentioned above, the content provider selects content to be provided as part of a content push service. This chosen content 7050 is catalogued in a distribution list 7010 (as shown in FIG. 10). Since the distribution list is to be passed to the broadcast centre 1000, thereby notifying the TV operator (of the broadcast centre 1000) of the content which is to be broadcast as part of the content push service, the list contains all of the information which will be required by the broadcast centre in order to administer the service.

The distribution list shown in FIG. 10 comprises two broad types of information:

Service specific information, and
Content specific information.

The service specific information includes:

a unique push list identifier which identifies the content provider providing the list and the service to which the list relates;
a version identifier which identifies the version of the service to which the list relates (allowing a content provider to update a service);
a description of the service (that is, the type of content which it contains and/or, in a particularly preferred embodiment, a textual description of the service for display to a user);
a start date which indicates the date from which content should be available for users to access;
an end date until which content should remain available for users to access; and
a flag indicating whether the service is mandatory or optional.

The content specific information includes, per item of content:

a content reference identifier (CRID);
a title of the item of content;
a flag indicating whether the item of content is mandatory (as explained elsewhere);
information indicating the size of the item of content—for content deliverable as a file, this will simply be the file size; for content which must be delivered as a data stream, this will be the average bit rate and the duration of the stream; and
information indicating the priority which the content provider places on the item of content (this priority is considered by the broadcast centre as described below).

As indicated above, in a particularly preferred embodiment, the content provider decides which of the content is mandatory and which is optional (that is, which is to be recorded on the hard disk of the receiver/decoder without user intervention, and which is to be selectable by the user for storage on the receiver/decoder). For example, a push service comprising a number of movies may contain as mandatory content one or more of the following:

a movie (or movies) which the content provider wishes to preposition on the hard disks of the receiver/decoders of a large number of users;
a trailer for a new movie which will soon become available to view at the cinema; and
advertisements which the content provider provides to generate additional revenue.

Usage and Business Rules, and Business Models

The content provider also decides upon the usage and business rules and business models under which certain content is to be made available and then passes details of these rules and models to the receiver/decoder.

Usage rules may include:

Limited number of accesses to the content (for example limited number of showings of a movie); and
A time period during which an item of content may be accessed.

Business rules may include:

The start date of accessibility of a particular item of content;
The end date of accessibility of a particular item of content; and
The charge for accessing an item of content.

Business models under which an item of content may be made available include:

An unlimited promotional offer, in which no rights need be purchased to access the content during a time window with no limit on the number of accesses of the content;
A limited promotional offer, in which no rights need be purchased to access the content during a time window with an upper limit on the number of accesses of the content;
Rental mode, in which content is rented for a fee for a time window with no upper limit on the number of accesses; and
Pay-per-user, in which content is rented with a limit on the number of accesses.

In a preferred embodiment, registration for a particular service is available to a user for no charge; only the storage and/or consumption of content attracts a fee. However, in another embodiment (for example, relating to services having mandatory content), a payment must be made by the user to enable him to receive the distribution list (and thereby register for the service).

Interface, and Editorial and Resource Data

As mentioned above, a content provider may wish to provide users with a particular user interface to access the content forming part of the service. This interface may have functionality and/or look and feel defined by the content provider.

In order to provide this interface, the content provider is able to provide additional information of two types:

Editorial information, and
Formatting information.

The structure of editorial information is illustrated in FIG. 11, which shows an extract from a distribution list 7010 showing that the movie "Wayne's World" is being made available, and that it has CRID 0. The editorial information comprises an allocation table 7012, which indicates the location within an archive 7020, of editorial information relevant to a particular item of content together with the type of the editorial information. In the embodiment shown, the editorial information allocation table 7012 includes two entries for the item of content having CRID 0. They are an item of text which can be found at location A within the archive 7020, and a still image which can be found at location B within the archive 7020.

Thus, in the embodiment shown, the editorial data includes an editorial description of the content (a short description of "Wayne's World" and a cast list), and for example, a still image. The editorial data in this embodiment are intended to attract users to the item of content.

The formatting information (not shown) in a first embodiment includes instructions for the display of an interface in a browser (for example, an XML file and a CSS (cascading style sheet), or an HTML file). In another embodiment, the formatting information comprises a proprietary interface application which is pushed to the receiver/decoders of users who have registered for the service. The user interface is described in further detail below.

Delivery of Material to the Broadcast Centre

Figure 12:
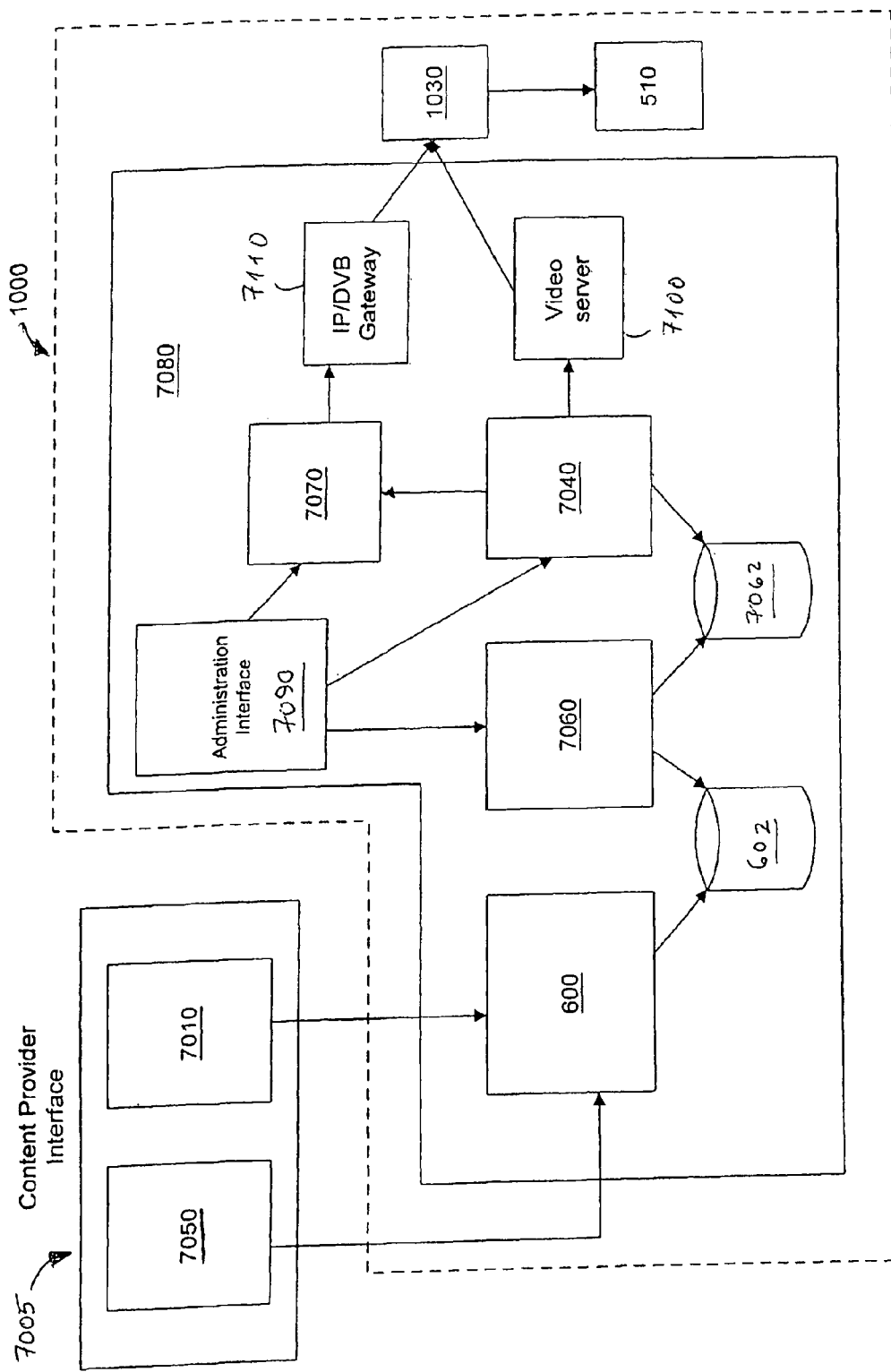
FIG. 12 shows the features of a broadcast centre relevant to the provision of a content push service.

As illustrated in FIG. 12, the content provider feeds the distribution list 7010 and related content to an upload server 600 at the broadcast centre 1000. Other content providers 4032 and 4034 may also supply distribution lists to the distribution list manager 7040, and an individual content provider 4030 may supply more than one distribution list relating to a number of different push services. The content provider also supplies, in an archive, editorial data 7020 including resource data 7030 relating to the content to be broadcast.

The distribution list, editorial data and the content are passed to the broadcast centre by the content provider in two distinct ways. Items which are deliverable in file form (for example, the distribution list, application data, music tracks, game data, data files and editorial data) are uploaded to the broadcast centre by the content provider. This upload may be achieved using a graphical user interface 7005 provided by an application resident on a computer at the content provider's premises or an application resident on a computer at the broadcast centre (for example via dial-up access). In a particular preferred embodiment, the delivery of content is achieved using an HTML upload interface running on an upload server which the content provider accesses using a login and password. The files relating to each service are delivered to a respective directory on the server. Items which are not deliverable as files (for example, content having a video component such as movies) are delivered in an MPEG-2 stream or in physical form on a video tape or DVD.

The Broadcast Centre

As indicated above, the TV operator's broadcast centre manages the content push service and organises the broadcasting of content received from content providers to users' receiver/decoders in a manner agreed by the content providers.

The roles of the broadcast centre are discussed in overview below.

Content Push Service Management

The broadcast centre oversees content push services: in particular providing functionality to allow a content provider to open a new content push service, close a content push service or modify a content push service. The broadcast centre itself has the ability to modify the push service environment, for example, by increasing or decreasing the allocated space on each receiver/decoder.

Distribution List Management and Delivery

The broadcast centre receives distribution lists from content providers and is responsible for the broadcasting of the scheduled distribution list to users' receiver/decoders as described below. The broadcast centre is also responsible for notifying receiver/decoders of the existence of push services.

Content Distribution

The broadcast centre is responsible for the management of bandwidth usage in the scheduling and distribution of content to receiver/decoders.

Update Capability

The broadcast centre is able to receive (in the manner described above) updated distribution lists from the content provider. A content item not appearing on the updated distribution list is revoked by terminating its broadcast and updating the corresponding scheduled distribution list so that it does not offer the revoked content item to the end user. If the content is already stored on the receiver/decoder, the deletion of the content is effected by software on the receiver/decoder (as described below), in response to receipt of the updated scheduled distribution list, if the user has not acquired user rights for the content item. If the user rights have already been acquired by the user, the deletion of the content item occurs when the user rights of the user have expired.

Royalty Information Reporting

In a preferred embodiment, the broadcast centre also comprises means for the management of audience reporting. This provides information on the number of users choosing to download each content item and obtain the user rights. In a preferred embodiment, the broadcast centre receives from receiver/decoders via the back channel 570 a periodic (for example weekly) report of user activity (for example, content stored, access rights acquired and content accessed). This information is stored in the broadcast centre which then creates a report for the content provider(s) based on this information. This report recites the unique identifier of the content, the time window during which the information was measured and the number of user rights delivered.

Structural Description of Broadcast Centre

The features of a broadcast centre in accordance with an embodiment will now be further described with reference to FIG. 12.

The broadcast centre comprises an upload server 600 which provides an interface to the content provider via which the content provider passes distribution lists, content, and so on to the broadcast centre. The upload server 600 stores the uploaded data in a first data store 602. This data is read by a distribution list manager 7060 which parses the distribution lists and prepares transmission schedules for the distribution lists and the content. The parsed distribution lists, the content to which they relate and the relevant schedules are stored by the distribution list manager 7060 in a second data store 7062. A push service scheduler 7040 reads the schedules produced by the distribution list manager 7060 and passes distribution lists and content at the appropriate times to a video server 7100 and a push delivery server 7070 as appropriate. The video server passes content to a multiplexer 1030 for insertion into a transport stream which is transmitted as described above. The push delivery server 7070 passes content and distribution lists and so on to an IP/DVB gateway 7110 which prepares the data for insertion into a transport stream by the multiplexer 1030.

Detailed Description of Broadcast Centre Functionality

The functionality of the broadcast centre in administering a content push service is now described in further detail. Returning again to FIG. 12, once the distribution list 7010 has been received by the upload server 600 (as described above under the heading "delivery or material to the broadcast centre"), it is passed to data storage 602 from which it is read by the distribution list manager 7060. The distribution list manager maintains a database 7062 including the distribution lists, editorial data relating to content identified in the distribution lists and the content itself. The distribution list manager 7060 ensures that most recent versions of distribution lists are processed by reading the version identifier from the distribution list.

In preferred embodiment, the data stored in the data stores 602 and 7062 are stored in the form of a database. In a further preferred embodiment, however, some or all of the data is stored in the form of XML files.

Additionally, the distribution list manager generates an announcement for broadcast to receiver/decoders indicating that a new push service is being made available.

The content distribution for a content push service is defined by a start and an end date in accordance with the time window required by the content provider. Between the start and end dates, the broadcast centre defines the distribution sessions in accordance with bandwidth resources available.

The distribution list manager 7060 is able to calculate from the duration and bit rate information and the file size of file content, the bandwidth required to transmit the content to the receiver/decoders.

The distribution list manager 7060 is also able to extract from the distribution list the priority information inserted by the content provider relating to particular items of content. For example, priority may be stated as HIGH, NORMAL and LOW, or on a numerical scale. The distribution list manager allocates a transmission frequency according to the stated priority. For example, an item of content which as been stated to be of HIGH priority may be allocated a transmission frequency of DAILY; an item of content which has been stated to be of LOW priority may be allocated a transmission frequency of WEEKLY.

From this information and from the start date and end date mentioned above, the distribution list manager 7060 generates timing information for broadcast sessions—that is the start time and duration of a broadcast session, and the timing of the broadcast of the items of content within the broadcast session. The transmission schedule information is added to the distribution list to form a scheduled distribution list along with information indicating the frequency of the transport stream in which the content will be transmitted and the PID(s) in which the content will be located (for example, each item of content may be allocated a unique PID or group of PIDs). The information added to the distribution list facilitates the management of content manipulation on receiver/decoders and in particular to receive content forming part of the push service.

The transmission of content may be scheduled to take place during periods of low general bandwidth usage, for example in the early hours of the morning, to enable an operator to make most efficient use of available bandwidth. The use of this less sought after bandwidth may enable a content provider to reduce the cost of distribution of its content.

The distribution list manager 7060 also generates a schedule for the periodic transmission of the announcement. The announcement is transmitted with this schedule information (including information relating to the location of the transmission of the distribution list—transponder frequency, PID, and so on) to receiver/decoders.

In a preferred embodiment, the distribution list manager 7060 performs the scheduling referred to above without human intervention. However, in a particularly preferred embodiment, a human operator uses an administration interface 7090 to monitor the processes performed by the various components of the broadcast centre described above, and in particular to influence the scheduling of the transmission of content.

The content to be delivered and the scheduled distribution list are stored in a data store 7062, pending access by the push service scheduler 7040.

The push service scheduler 7040 monitors the data stored by the distribution list manager 7060 in the data store 7062 and parses the transmission schedules (for transmission of the announcement, the scheduled distribution list, and the content itself) and passes the relevant data to the video server or the push delivery server. Movie data is passed to the video server 7100 where it is prepared in a known manner for insertion into the transport stream. Other data is passed to the push delivery server 7070 which, when appropriate, encapsulates the data into MPEG-2 packets in a known manner.

The video server 7100 and the push delivery server 7070 pass data to the multiplexer 1030 which operates in a known manner to produce a transport stream for transmission.

In a preferred embodiment, the announcements are inserted into a dedicated announcement channel (for example, a predetermined PID in the or each transport stream being transmitted by the broadcast centre).

Delivery of Content

As indicated above, at the time scheduled for the delivery of the scheduled distribution list, the list is passed from the second data store 7062 by the push service scheduler 7040 to the push delivery server 7070 which transmits it along with the editorial data to receiver/decoders. Then, at the time scheduled for delivery of the content, the various items of content are also transmitted during the scheduled broadcast sessions.

Content which is deliverable in file form (as discussed above), such as the scheduled distribution list itself, is passed to a push delivery server 7070 which oversees the transmission of the content. The files are placed in MPEG-2 sections (DSM-CC sections) for transmission. The mode of transmission may be:

a DSM-CC data carousel;
  private sections within an MPEG-2 stream (such as the C: channel for PC software, for example); or
  DVB multi-protocol encapsulation (DVB-MPE) using IP multicast.

The embodiment shown uses a IP/DVB solution and so the content to be transmitted is passed via the push delivery server 7070 to a IP/DVB gateway 7110 where the files are prepared as IP data which are encapsulated in MPEG-2 packets before being passed to the multiplexer and then transmitted.

The Receiver/Decoder

As described above, the purpose of a content push service is to pre-position content on a receiver/decoder for access by a user upon request. In order to achieve this, notification of the existence of a service is sent to the receiver/decoder and a user may elect to receive the distribution list for that service. Having received the distribution list, the user is able, using an interface 8000 (see FIG. 13a), to select content from the service that he wishes to have delivered to his receiver/decoder. The receiver/decoder then stores the selected content when it is transmitted by the broadcast centre. The user is than able to access stored content via the user interface.

The role and functionality of the receiver/decoder in the context of content push services is now described in further detail.

Receiver/Decoder Hard Disk

A portion of the hard disk 2100 located within the receiver/decoder is reserved for the storage of content provided in content push services. Content providers are able effectively to rent space on the receiver/decoder hard disk for the pre-positioning of their content such that it is available for the user to view at leisure. This reduces traffic on the broadband in peak times when users are most likely to want to watch chosen programmes.

Content Push Service Management

One of the further applications 3120 of the application layer described above with reference to FIG. 6 is a content push service manager. This is a resident application which oversees activity on the receiver/decoder relating to content push services. The responsibilities of this application include:

monitoring of the announcement channel (described above) for announcements regarding the delivery of new and/or updated scheduled distribution lists;
  notifying the user of available distribution lists;
  handling automatic registration to mandatory services and user initiated registration to optional services;

In addition, the content push service manager has some responsibility over a resource schedule containing information regarding the date, time and duration of periods during which hardware and software resources of the receiver/decoder (for example, tuners, and so on) will be required (in a particularly preferred embodiment, this schedule is additionally or alternatively accessed and maintained by the organiser module described elsewhere), and over a database of stored content provided by content push services. Both the resource schedule and the stored content database are also accessible by calls to a content push service API described elsewhere. In a particularly preferred embodiment, the content push service manager 3120 makes such calls in order to provide the above functionality.

Via a user interface provided, for example, by the content push service manager application 3120, the user is able to register for and unregister from an optional content push service. The content push service manager 3120 also allows the user (using the remote control 2080) to launch the Service Guide Interface relating to a content push service.

Upon receipt of an instruction from a user to unregister from a service, the content push service manager application is responsible for the deletion of all content related to the respective content push service on the receiver/decoder. The deletion is immediately effective if there remains no content with active user rights stored on the receiver/decoder. However, if there remains at least one content item with active user rights stored on the receiver/decoder, no global deletion occurs; only the content without active user rights is deleted.

The content push service manager 3120 is also responsible for the deletion of content relating to a content push service when that content or that push service is no longer available. In this case also, only content without active user rights is deleted. The user is notified of the deletion of the content/discontinuation of the service.

The Content Push Service API

As indicated above, the API 3300 (preferably the proprietary packages section 3330) includes commands and events relating to the management of content push services. Such commands can include commands to list all available push services, all registered push services, all unregistered push services, stored content (with restrictions available according to whether access rights are present), content selected for storage, and so on. In a particularly preferred embodiment, the lists may include content filtered according to user preferences and/or profiles provided by the preferences and/or recommendations modules described elsewhere. In a further preferred embodiment, the lists resulting from calls to these commands are provided in the form of an XML document enabling the information to be formatted for display to a user. Further commands relate to the registration to and deregistration from services, deletion of stored content, the extraction of editorial information relating to particular items of content, the accessing of content, the moving of stored content from the reserved portion of the hard disk 2100 to a portion under user control, and so on. Events forming part of the API may include events indicating that storage of an item of content has been completed, an item of content has been deleted, an announcement relating to a new/updated service has been received, and so on.

Receipt of Announcement

As indicated earlier, when a content push service is made available; the broadcast centre transmits an announcements that a distribution list is available, and bearing the title of the service, its description and related material. This announcement is preferably received via a dedicated channel (PID) in an MPEG-2 transport stream. Alternatively, the announcements may be received from an object carousel monitored or checked periodically by the receiver/decoder.

Such announcements are passed to the content push service manager 3120 which notifies the user of the availability of the service described in the announcement (for example, by updating a list of available services accessible by the user via the program guide application mentioned above or via a graphical user interface provided by the content push service manager 3120). The user is able to indicate a desire to register for a particular service, for example by pressing a predetermined key (for example a "Select" or "OK" button) on the remote control 4080.

Receipt of Scheduled Distribution List

The notification described above also contains information regarding the transmission schedule of the distribution list. When a user indicates a desire to register for a service as described above, the content push service manager 3120 extracts from the announcement information regarding the transmission of the scheduled distribution list. This information may include, for example, the date and time of transmission and the transport stream and PID(s) upon which the scheduled distribution list will be transmitted. The content push service manager passes this information to the resource schedule, and at the scheduled time the content push service manager causes the distribution list to be downloaded (for example by tuning a tuner to the relevant transport stream and causing the filtering of the relevant PID(s)).

Once the scheduled distribution list has been received, the content push service manager 3120 parses it looking for mandatory content. Information regarding the transmission of mandatory content (for example, the date and time of transmission and the transport stream and PID(s) upon which the content will be transmitted) is extracted from the distribution list by the content push service manager and passed to the resource scheduler.

User Interface

As mentioned above, the receiver/decoder displays for the user a user interface allowing access to the content push service. In a preferred embodiment, the user interface is displayed as a walled garden application in a browser. In another embodiment, the interface is displayed by an application (particularly a Java application), which in further embodiments is proprietary to the content provider providing the service.

The interface allows the user to view the optional content of the push service, and after delivery of content, to access stored content. Furthermore, the user is able to buy rights to access content, set and modify user preferences, delete stored content, and so on. In a preferred embodiment described further below, the user is able to elect to receive all content of a particular type without further intervention.

In a preferred embodiment, the interface provides to the user the functionality described above with reference to the API, by making calls to the relevant commands of the API.

When a user selects content for storage (as described below), the content push service manager 3120 or the user interface passes information relating to the transmission of the selected item of content (for example, the date and time of transmission and the transport stream and PID(s) upon which the content will be transmitted) to the resource schedule.

Embodiments of the user interface are now described in further detail.

In a preferred embodiment, the interface takes the form of a walled garden displayed in a browser. Software resident on the receiver/decoder contains a browser supporting the cascading style sheets extension of XML. As described above, the content provider provides an XML document and a style sheet associated with the service. The browser uses the document and style sheet to build an interface. In a similar embodiment, the content provider simply provides an HTML document.

In addition to the titles of the content forming part of the service, the interface displays any editorial data received from the broadcast centre relating to the service. The format of the display of this material is determined by the interface information provided by the content provider. The interface also displays to the user the next data of availability of the items of content (that is the date and time of the next distribution session during which the content will be transmitted, as specified in the scheduled distribution list).

Figure 13A:
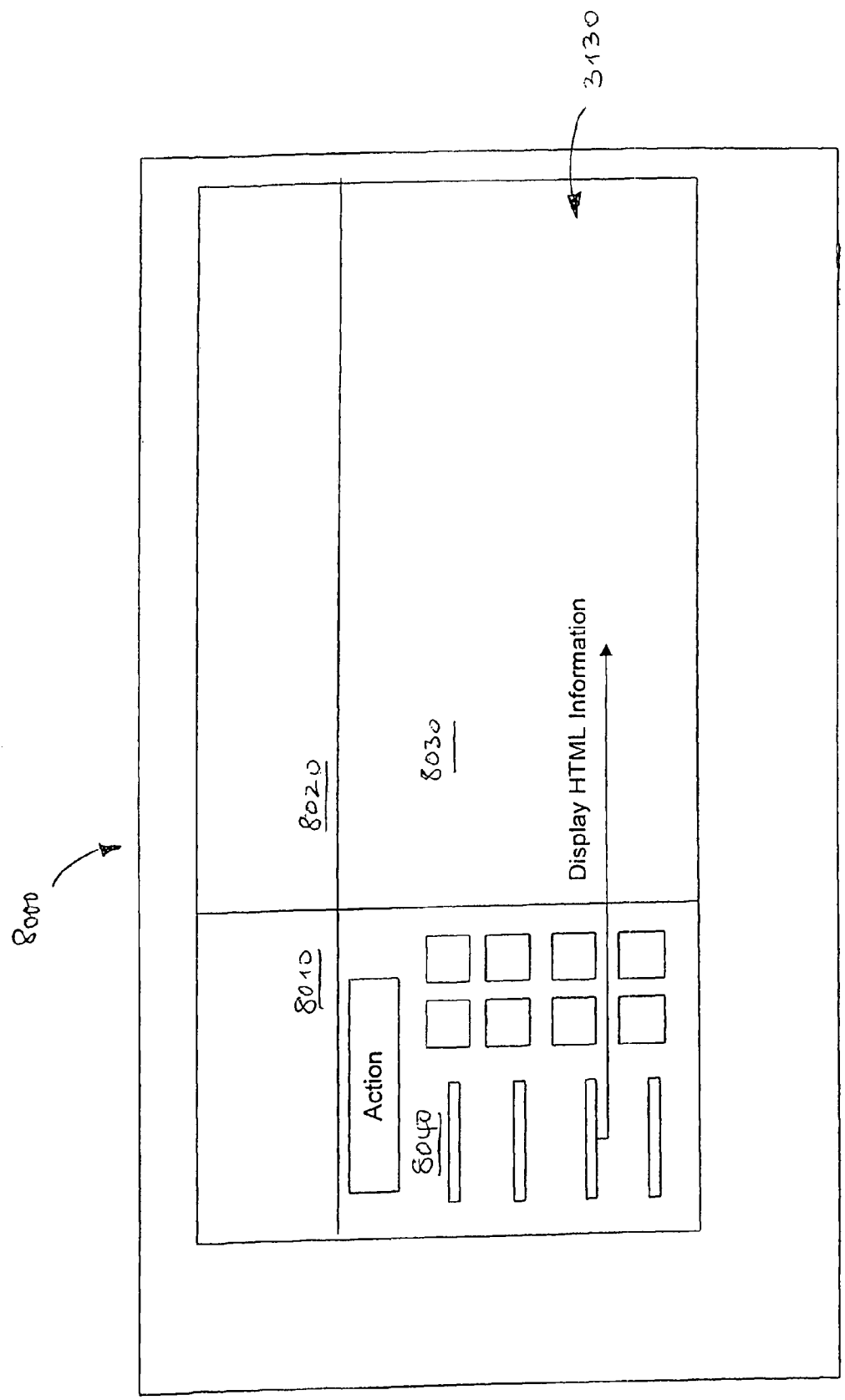
FIG. 13a shows a simple example of a user interface to a push service.

FIG. 13a illustrates an example of a simple interface. This interface is provided within the browser application 3130. The interface comprises four panes: an action pane 8040 which lists the contents of the push service (preferably sorted and/or filtered according to criteria such as content not stored, content stored without access rights, content stored with access rights, content of a particular type, and so on) in a manner allowing an item of content to be selected (for example, by moving a focus and by pressing a predetermined key on the remote control), and first and second banner panes 8010, 8020 (in which are displayed banners relating to the service, the content provider or advertisements), and a context sensitive pane 8030 in which is displayed an HTML page provided by the content provider for display to the user. In a preferred embodiment, this page does not allow the user to perform any action relating to the selected content; only editorial information relating to the selected content is displayed.

Figure 13B:
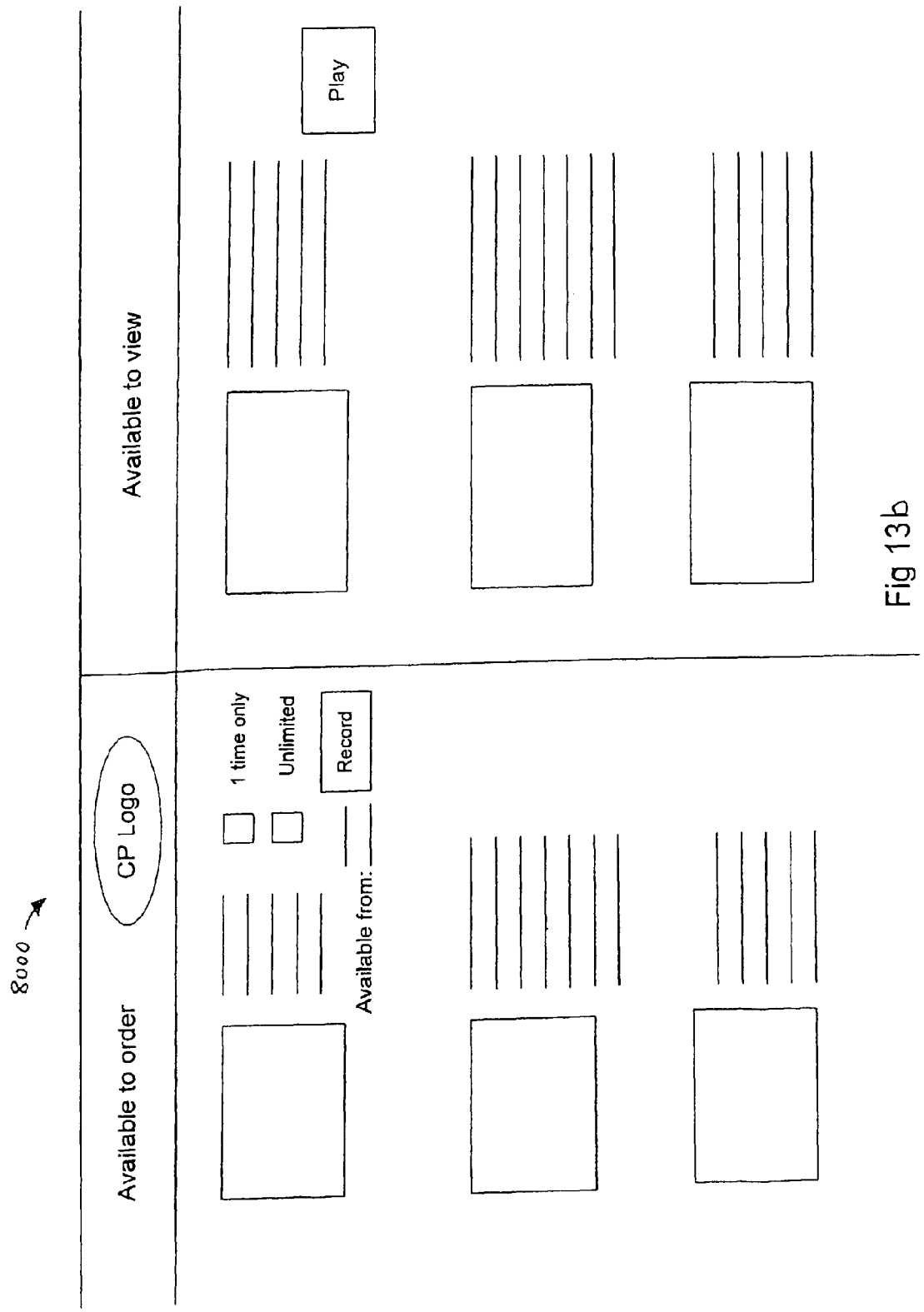
FIG. 13b shows an unpopulated walled garden interface to a push service.

FIG. 13b illustrates a walled garden interface 7080. The interface shows the different options available to the end user with respect to content choice, rights available and so on. The embodiment shown has a screen split into panes, one showing content available to order ("record") and the other showing content available to access ("play"). There is further an icon (visible when appropriate) showing whether rights to view the content item are available. This may instead be shown on a further screen, potentially also divided into pane as illustrated in FIG. 13b; one shows content already downloaded but with the rights to view not yet purchased, the other pane shows content already downloaded and immediately viewable.

In a preferred embodiment, the interface also shows the pricing information for accessing the content. Content items have pricing information associated with them, which gives the range of costs for the range of user rights to the content (for example, a cost of seeing a film once, a different cost for unlimited viewings in a certain period of time, and so on). This information is extracted from the editorial information relevant to a particular item of content by a call to the API.

As illustrated in FIG. 13b, the walled garden includes an icon labelled "record" which is associated with a content item. Alternatively, the user may select an item of content to store by selecting a portion of the editorial data, for example, the title of a movie or a still image associated with the movie. The interface also includes a list of access options; for example, a user may choose to store an item and specify that they wish to obtain rights to view that content once only, an unlimited number of times for the duration of one month; or that they may wish to defer purchase of user rights, and so on.

In a preferred embodiment mandatory content (described elsewhere) includes advertisements and/or logos which are displayed as part of the user interface. In another embodiment (not shown) mandatory content includes video clips which are displayed, for example, upon launch of the user interface.

In order to select the "record" icon or the "play" icon (or any other choice available), the user controls the movement of a cursor over the screen with direction buttons on the remote control 2080. The content associated with the icon is then registered to be either stored when the broadcast session begins, or (as appropriate) accessed by the receiver/decoder (for example, played back if the content is a movie). There is further an icon for purchasing user rights to the stored or to be stored content. This may be chosen in the same manner as the record and play icons, and methods of payment will be shown to the user.

In another embodiment (not shown) the interface displays options to a user in the form of a mosaic. A grid of images indicating the various items of content is displayed in a first portion of the screen and a second portion of the screen displays context sensitive messages as a user moves a focus from one image in the first portion of the screen to another. The context sensitive messages include, in a first embodiment, a description of the item of content to which the focussed image relates. In a further embodiment, the message in the second portion of the screen also includes options for the selection of the content, the purchase of rights to access it, and so on.

In a preferred embodiment, there are links, buttons or other means displayed which the user may user to "purchase rights to access" and to "access stored content".

In a particular embodiment (not shown) in which a user has purchased rights to access an item of content, the interface displays further detailed information on the user's user rights such as "you may view this content three more times" or "user rights will expire in one week".

Storage of Content

During a distribution session, the content forming part of a service is transmitted as described above.

In a preferred embodiment, editorial data for the push service is also stored. In a further embodiment, only editorial data relating to a content item which is stored is stored on the hard disk.

The resource schedule (mentioned above) contains information representative of the location within the distribution session of content which is to be stored. Audio/visual content is stored at the relevant time by the PVR application 3154 (mentioned above) and other content is stored at the relevant time by the software download application 3140 (also mentioned above). In each case, in a first embodiment, the relevant application extracts from the resource schedule (described elsewhere), or is notified by the resource schedule, the date and time that content is to be downloaded. The application then organises in a known manner the filtering of the relevant PID(s) from the appropriate transport stream (or, as the case may be, the extraction of the relevant objects from an object carousel) at the time indicated in the scheduled distribution list that the relevant content would be transmitted.

In an alternative preferred embodiment, the timing of the download of content is managed using action notification tables (as described in our copending European Patent Application No. 01309218.4, the contents of which are hereby incorporated by reference). These are passed to targeted receiver/decoders in a transport stream and they may be used to cause the receiver/decoders to perform actions including the download of content, automatic channel scanning, rebooting of the receiver/decoder, refreshing programme catalogues and displaying a message to the user of the receiver/decoder. In the context of a content push service, such tables may be used to cause a receiver/decoder to download content automatically, notifying the receiver/decoder of the date and time of transmission of the content (and the frequency of transmission of the content).

Conflict Management

One of the applications 3120 mentioned above with reference to FIG. 6 is an organiser module for dealing with conflicts. A conflict might arise for example if the receiver/decoder did not have sufficient resources to accommodate a request by a user. Examples include a request to store content for which there is not sufficient available capacity on the hard disk, and a request to download content which would require a tuner to be detuned from a frequency upon which it is actively tuned. The organiser module has access to the resource schedule which contains information indicating requirements upon resources (such as, for a tuner, a date and time upon which the tuner must be tuned to a particular frequency). When information is added to the resource schedule, the organiser module checks whether the required allocation of resources is in conflict with earlier scheduled allocation and passes an error message to the content push service manager 3120 if a conflict should arise. In a preferred embodiment, when a conflict is detected, the content push service provides information to the user to indicate what actions must be taken—for example, if some content must be deleted before more content can be stored. There exists a conflict policy which dictates the order of priority when dealing with conflicts between applications and the content push service.

Rights Management

In some embodiments, content is transmitted to and stored by receiver/decoders before rights are acquired by the user. A user wishing to access content for which rights are required must request such rights; the request is communicated by the service guide interface to the CMPS system 2300 which communicates a request for user rights to the broadcast centre via the back channel 570. In a preferred embodiment, content is stored in an encrypted form and upon purchase of user rights, a control word or control words for the descrambling of the content are passed to the receiver/decoder. In a further preferred embodiment, a control word or control words for the descrambling of the content are provided with the content, the control word or words also being encrypted and upon purchase of user rights, a key or keys for the decryption of the encrypted control words are passed to the receiver/decoder.

The service guide interface displays information regarding whether rights to view the content have been obtained or not. There are several methods of dealing with user rights, the preferred two are mentioned below:

- The user decides what access options are required and requests that the content is stored on the receiver/decoder. Upon completion of storage, the content is available to access immediately; either due to the user's registration to the service of which the item of content forms a part, or since the item of content is available to access free of charge.
- The user decides what access options are required and requests that the content is stored on the receiver/decoder. The user then decides which user rights to purchase (one view only/unlimited and so on). When the rights have been purchased, the content then becomes available for access.

Within the latter, there are sub-options regarding when the user rights may be purchased. For example, rights may be purchased before or after a particular item of content has been stored on the hard disk of the receiver/decoder.

In a preferred embodiment, the content push service API described elsewhere further comprises commands and events for facilitating commercial transactions which may be undertaken by a user. Commands provided may include commands to request rights to access a particular item of content, commands for passing payment information to the broadcast centre, and so on. These commands may also preferably be called by the service guide interface.

Accessing Locally Stored Content

The user interface in the receiver/decoder lists the content available for the user to watch. Available content is content which has been stored onto the receiver/decoder's hard disk 2100 and for which user rights are active (that is, have been paid for and have not expired).

The user may move a focus or a cursor around the display of stored items (as described above) and select a particular item of content for access. In the event that the selected item of content audio/visual content, the user interface instructs the PVR application to commence playback of the content as described above. In the event that the selected content is an application, it is launched from the hard disk by the application manager 3110 described above.

It is possible for a user to retain stored content for a period (if the user has the correct user rights). In a particularly preferred embodiment, the content may be moved to a user-controlled area in the hard disk and stored with other content that the user wants to keep (for example, other related content), thus increasing hard disk capacity available to push services. The user may effect this by an option provided by the service guide interface which makes a call to the APT described elsewhere.

Deleting a Content Item

When a new scheduled distribution list is received, the receiver/decoder automatically deletes locally stored content not listed on the new scheduled distribution list and for which no active user rights exist. Otherwise, a user may delete optional content from the receiver/decoder upon as desired.

In a particularly preferred embodiment, the content push service manager 3120 effects deletion of content (using the API described elsewhere) when the period of availability of content (as defined in the distribution list) expires.

Recommendation Module

One of the applications 3120 mentioned above with reference to FIG. 6 is a recommendation module which creates and edits user profiles. The recommendation module is a resident application which monitors the viewing habits of the user and sets up the profile accordingly. For instance, the recommendation module 3120 may observe that the user watches a lot of sport, news and action movies; and record profile data indicating this. As a result of this monitoring (which is not limited to the monitoring of interaction with content provided in a content push service), the module is able to recommend certain relevant content items to the user depending on the monitored viewing habits. In a preferred embodiment, this module is only activatable by a user if it is authorised by the push service.

Preferences Module

Another of the applications 3120 mentioned above is a preferences module, which is also a resident application. The preferences module prompts the user to enter profile data using the remote control 2080. The profile data may include the user's city/region of residence, marital status, age, or interests (for instance indicating that the user is interested in sport, news and action movies). The profile data is stored in the hard disk 2100 by the preferences module and the user may edit the stored profile data at any time. In a particularly preferred embodiment, the user may use the preferences module 3120 to automatically select content having a particular type. For example, a user may input into the preferences module a request to store all content for which certain terms are present in a field of the distribution list (for example, types of television programme, or content relating to a particular personality).

Audience Reporting

In a further embodiment, content providers are able to request that the broadcast centre provides statistics on content usage for a particular content push service. The broadcast centre maintains records of the number of users acquiring user rights, the number of times a particular content item is accessed, and so on.

Furthermore, the receiver/decoder comprises an audience reporting application 3120 which maintains a record of content push service activity with respect to storage, access and deletion of content. The record file contains a list of contents to be stored and the push list information of each content item stored. This record is provided to the broadcast centre, for example by a report submitted periodically via the back channel 570.

SPECIFIC EXAMPLE

Mike Myers Season

Figure 13C:
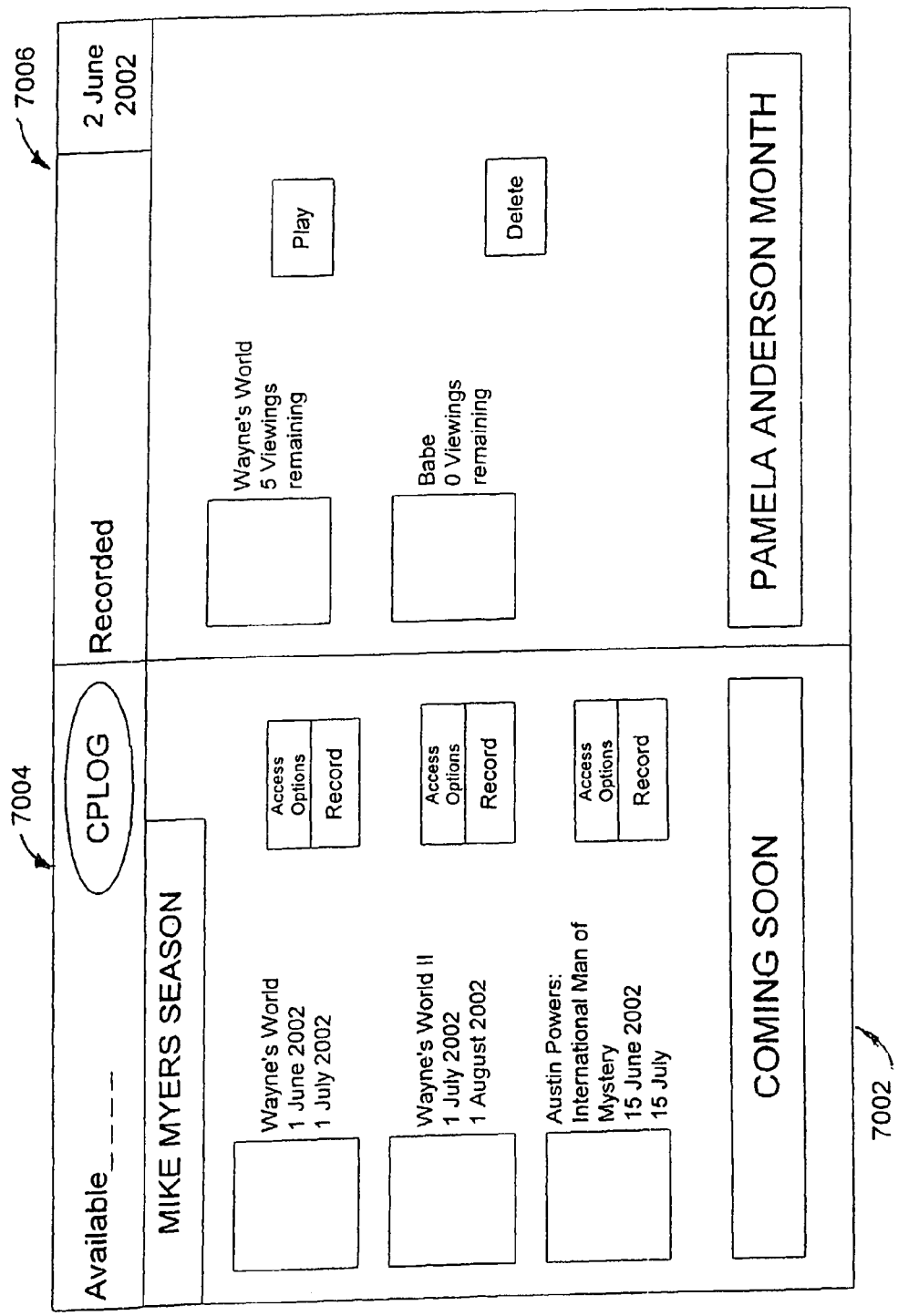
FIG. 13c shows a populated walled garden interface to an example push service.

In a particularly preferred embodiment, a content provider may use a scheduled distribution list, for example as illustrated in FIG. 13c, for a specific content theme (such as movies starring Mike Myers, as shown). The boxes on the left of the screen may show titles, descriptions and still images of movies available to be recorded, as well as dates at which the movies will be available for storage on the receiver/decoder. This is the optional content, the schedule distribution list for which the user has chosen to record. The content provider logo 7004 and the advertisement banners (for example from the same or other content providers) 7002 are mandatory content within an optional schedule distribution list and are shown automatically. Alternatively, the logo and/or the advertisement banners may form part of the editorial data described elsewhere.

The user may choose to record the movies listed on the left of the screen by moving the cursor over the record icons on the screen and pressing the appropriate button on his remote control. In this example, the user has already chosen to record "Wayne's World" and so information relating to the movie appears on the right hand panel of his screen with the option to playback the movie. The user's user rights are described along with the movie. The panel also show the user what other content has been stored on his hard disk and the relevant user rights. In this case, the movie "Babe" has previously been recorded and the user now has the option to delete it.

Example of Content Life Cycle

Figure 14:
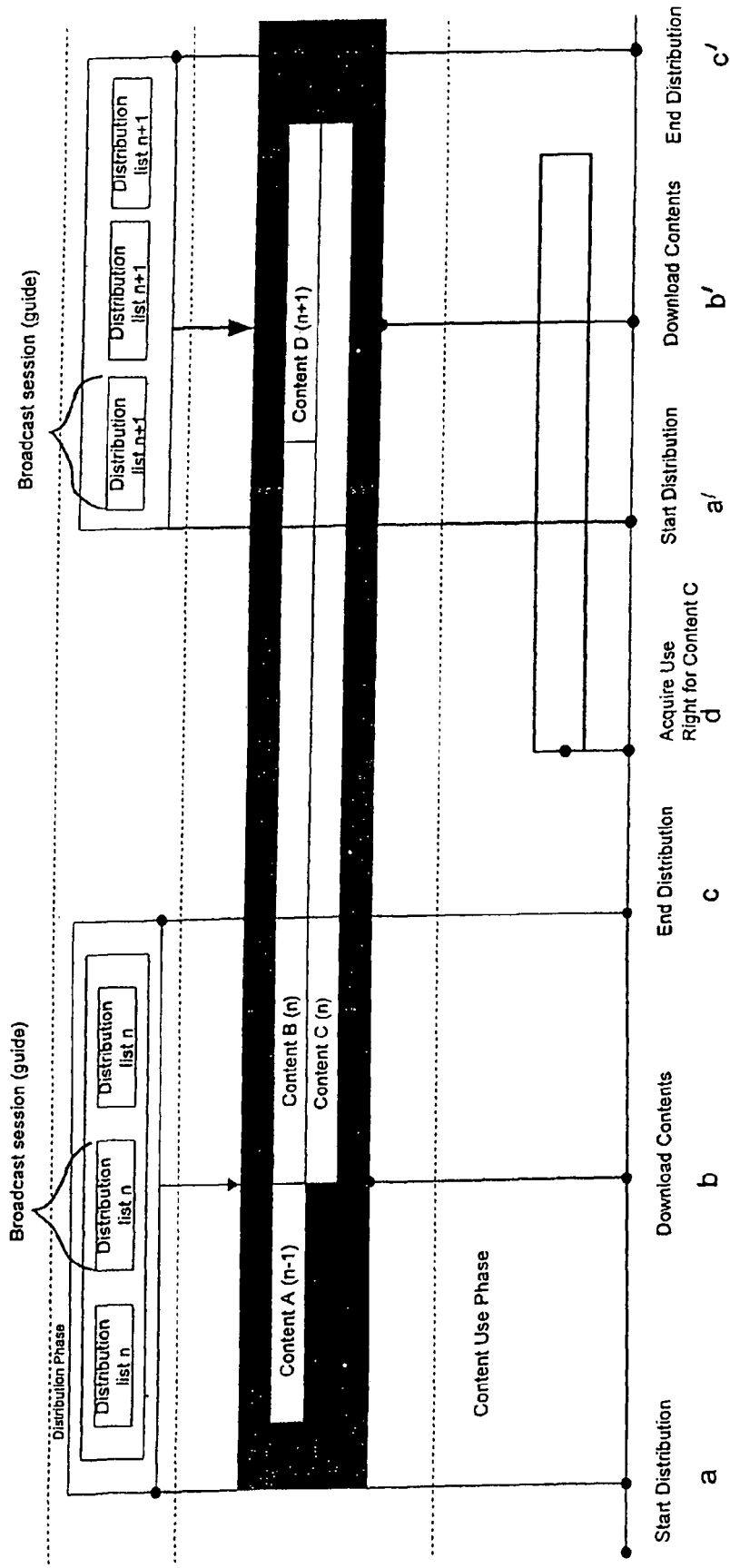
FIG. 14 illustrates the life cycle of content in a content push service.

FIG. 14 illustrates the "life cycle" of content provided in content push services using a time line. In this example, at the beginning (left hand end) of the time line, Content A (provided by a particular distribution list number n–1) is stored on a receiver/decoder. At point a, the distribution session (that is the period of availability) of distribution list number n begins. During a second transmission session of content from distribution list n (providing Content B and Content C), Content B and Content C are transmitted. In this example, the period of availability to the use of Content A has expired by this point (it is not provided in distribution list n), and no user rights for content A are outstanding; Content A is therefore deleted. Content B and Content C have been selected for storage by the user and so they are stored on the hard disk. At point d, the user acquires user rights for C.

At point a', the distribution phase of distribution list n+1 (relating to Content D and Content E (not shown)) commences. During a second transmission session, Content D (which has been selected for storage by the user) is stored on the receiver/decoder. Content E has not been selected in this example, and so it is discarded. Furthermore, since Content B is not present on distribution list n+1 and since the user does not have any outstanding rights to access this content, it is deleted and replaced with Content D. However, although Content C is not provided on distribution list n+1, the user does have outstanding rights to access this content and so it is not deleted.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be recorded in ROM, or may be patched in FLASH.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:
1. A receiver/decoder comprising:
a receiver for receiving content prior to commencement of a defined period of availability of said content to a user;
a memory for storing said content and for deleting a stored item of content upon expiry of the defined period of availability of the stored item to the user; and
a processor for enabling the user to access the stored content upon request following commencement of said defined period of availability and for generating a display of guide data associated with forthcoming content to enable a user to select content for storage by the receiver/decoder upon receipt thereof, wherein said guide data comprises an indication of the defined period of availability of the content to the user, the defined period of availability having a start date and an end date, wherein the processor is further configured to:
charge a user's account upon playback of, or access to, said stored item of content,
compile data relating to content stored in the memory over a period of time, and to communicate said compiled data to a communications server, and
generate an alert when the memory has insufficient storage capacity for storing received content, and wherein the receiver/decoder receives, from a transmitter configured to transmit, the guide data relating to a plurality of items of content, and each of said plurality of items of content relating to which said guide data relates.

2. The receiver/decoder according to claim 1, wherein said guide data comprises a textual display of data associated with said content.

3. The receiver/decoder according to claim 1, wherein said guide data comprises a plurality of images each associated with a respective item of content.

4. The receiver/decoder according to claim 3, wherein said processor generates a display of said plurality of images in respective windows of a mosaic formation.

5. The receiver/decoder according to claim 1, wherein the defined period of availability is a period of time during which previously downloaded data is available for rendering to the user.

6. The receiver/decoder according to claim 1, wherein said display comprises an advertisement in a dedicated portion thereof.

7. The receiver/decoder according to claim 1, wherein the processor is arranged to generate a cursor for display over said guide data, said cursor being selectively movable in response to received user inputs to enable user selection of a portion of the displayed guide data.

8. The receiver/decoder according to claim 7, wherein the processor is further configured to control storage of an item of content in response to user selection of a portion of the displayed guide data associated with that item.

9. The receiver/decoder according to claim 8, wherein said portion comprises an icon.

10. The receiver/decoder according to claim 8, wherein said portion comprises an image associated with said content.

11. The receive/decoder according to claim 1, wherein said receiver is arranged to receive a plurality of items of content, and wherein the memory is configured to identify and store the received items which have been selected for storage by the user.

12. The receiver/decoder according to claim 1, wherein the processor is further configured to initiate the playback of, or access to, a stored item of content in response to a user request.

13. The receiver/decoder according to claim 1, wherein the amount of said charge varies during the defined period of availability of the stored item to the user.

14. The receiver/decoder according to claim 1, wherein the amount of said charge is dependent upon a number of times of previous user playback of, or access to, said stored item of content.

15. The receiver/decoder according to claim 1, wherein said receiver is arranged to receive a distribution list including said guide data.

16. The receiver/decoder according to claim 15, wherein said distribution list indicates to the receiver/decoder whether storage of an item of content received thereby is compulsory.

17. The receiver/decoder according to claim 16, wherein the receiver/decoder uses the indication by the distribution list to control the compulsory storage of an item of content in the receiver/decoder.

18. The receiver/decoder according to claim 1, wherein the processor is further configured to generate a display of content stored in said receiver/decoder.

19. The receiver/decoder according to claim 1, wherein the receiver/decoder purchases rights to access a stored item of data.

20. The receiver/decoder according to claim 1, wherein the memory deletes a stored item of content upon request by the user.

21. The receiver/decoder according to claim 1, wherein the memory deletes a stored item of content upon user playback of, or access to, said stored item of content.

22. The receiver/decoder according to claim 1, wherein the memory comprises a hard disk.

23. The receiver/decoder according to claim 22, wherein said content is stored in a dedicated portion of said hard disk.

24. The receiver/decoder according to claim 1, wherein the processor is further configured to filter received content according to a user's preferences.

25. The receiver/decoder according to claim 24, wherein the memory automatically stores filtered content.

26. The receiver/decoder according to claim 24, wherein the processor determines the user's preferences from content previously selected by the user for storage.

27. The receiver/decoder according to claim 1, wherein the processor is further configured to generate a display, for recommending to a user, content for storage according to the user's preferences.

28. The receiver/decoder according to claim 1, wherein the processor generates the display in a format specified by a provider of said content.

29. The receiver/decoder according to claim 28, wherein said format is specified by one of a template comprising the guide data arranged in said display or an application for arranging the guide data in said display.

30. A system for providing content to a user, said system comprising:
a transmitter for transmitting, to a user's receiver/decoder, guide data relating to a plurality of items of content, and each of said plurality of items of content relating to which said guide data relates, prior to commencement of a defined period of availability of said items of content to the user, the defined period of availability having a start date and an end date, wherein the guide data comprises an indication of the defined period of availability of the content to the user; and
a receiver/decoder comprising:
a receiver for receiving said guide data and said items of content,
a memory for storing the selected at least one item of content upon receipt thereof and for deleting a stored item of content upon expiry of the defined period of availability of the stored item to the user,
a processor for:
generating a display of said guide data to enable a user to select at least one of said items of content for storage,
charging a user's account upon playback of, or access to, said stored item of content, compiling data relating to content stored in the memory over a period of time, and to communicate said compiled data to a communications server, and generating an alert when the memory has insufficient storage capacity for storing received content, wherein the receiver/decoder provides access to the stored at least one item of content upon request following commencement of said defined period of availability.

31. An apparatus for transmitting content to a receiver/decoder, said apparatus comprising:
    a transmitter for:
        transmitting to said receiver/decoder guide data for use by the receiver/decoder in generating a display for a forthcoming plurality of items of content for selected storage in the receiver/decoder, and
        transmitting to said receiver/decoder each of said items of content to which said guide data relates for selected storage by the receiver/decoder prior to commencement of a defined period of availability of said items of content to a user, the defined period of availability having a start date and an end date, wherein the guide data comprises an indication of the defined period of availability of the content to the user,
    wherein the receiver/decoder comprises:
        memory for storing said items of content and for deleting a stored item of content upon expiry of the defined period of availability of the stored items of content to the user, and
        a processor configured to:
            charge a user's account upon playback of, or access to, said stored item of content,
            compile data relating to content stored in the memory over a period of time, and to communicate said compiled data to a communications server, and
            generate an alert when the memory has insufficient storage capacity for storing received content.

32. The apparatus according to claim 31, wherein the transmitter transmits to said receiver/decoder at least one item of content for compulsory storage by the receiver/decoder.

33. The apparatus according to claim 32, wherein said guide data indicates to the receiver/decoder whether storage of an item of content received thereby is compulsory.

34. The apparatus according to claim 31, comprising a receiver for receiving said guide data and said items of content from at least one content provider.

35. The apparatus according to claim 34, wherein said guide data is included in a distribution list received from said content provider.

36. The apparatus according to claim 35, comprising a processor configured to extract, from the distribution list, at least one of an identifier and a version identifier for the distribution list.

37. The apparatus according to claim 31, comprising a processor for scheduling a time of transmission of an item of content to the receiver/decoder.

38. A method of providing content to a user, said method comprising:
    at a transmitter,
        transmitting to a user's receiver/decoder guide data relating to plurality of items of content, and transmitting to said receiver/decoder each of said items of content to which said guide data relates, prior to commencement of a defined period of availability of said items of content to the user, the defined period of availability having a start date and an end date, wherein the guide data comprises an indication of the defined period of availability of the content to the user;
    at a receiver/decoder,
        receiving said guide data and said items of content,
        storing said guide data and said items of content in memory,
        generating a display of said guide data to enable a user to select at least one of said items of content for storage,
        storing the selected at least one item of content upon receipt thereof, and enabling the user to access the stored at least one item of content upon request following commencement of said defined period of availability,
        charging a user's account upon playback of, or access to, said stored item of content,
        compiling data relating to content stored in the memory over a period of time, and to communicate said compiled data to a communications server, and
        generating an alert when the memory has insufficient storage capacity for storing received content.

* * * * *